US012561018B2

(12) United States Patent
     Bok

(10) Patent No.: US 12,561,018 B2
(45) Date of Patent: Feb. 24, 2026

(54) DISPLAY DEVICE HAVING TOUCH ELECTRODES AND BURIED TOUCH LINES BENEATH PLANARIZATIONAND BANK LAYERS

(71) Applicant: Samsung Display Co., LTD., Yongin-si (KR)

(72) Inventor: Seung Lyong Bok, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/933,546

(22) Filed: Oct. 31, 2024

(65) Prior Publication Data

US 2025/0284353 A1 Sep. 11, 2025

(30) Foreign Application Priority Data

Mar. 5, 2024 (KR) ......................... 10-2024-0031303

(51) Int. Cl.
     *G06F 3/041* (2006.01)
(52) U.S. Cl.
     CPC .......... *G06F 3/0412* (2013.01); *G06F 3/0416* (2013.01)
(58) Field of Classification Search
     CPC .... G06F 3/0412; G06F 3/0416; G06F 3/0443; G06F 3/0446; G06F 3/04164
     See application file for complete search history.

(56) References Cited

U.S. PATENT DOCUMENTS

| | | | |
|---|---|---|---|
| 11,500,484 | B2 | 11/2022 | Bok et al. |
| 2019/0286270 | A1* | 9/2019 | Bok ..................... G06F 3/0446 |
| 2022/0129100 | A1 | 4/2022 | Tsao et al. |
| 2023/0069851 | A1 | 3/2023 | Bok et al. |
| 2024/0004494 | A1 | 1/2024 | Bang et al. |

FOREIGN PATENT DOCUMENTS

| | | |
|---|---|---|
| CN | 115951796 | 4/2023 |
| KR | 20150073418 A | 7/2015 |
| KR | 20170076185 A | 7/2017 |
| KR | 20170113524 A | 10/2017 |
| KR | 20210085202 A | 7/2021 |
| KR | 20240003021 A | 1/2024 |

* cited by examiner

*Primary Examiner* — Yaron Cohen
(74) *Attorney, Agent, or Firm* — CANTOR COLBURN LLP

(57) ABSTRACT

A display device includes a display panel having a plurality of pixels disposed in a display area, a touch sensing unit having a plurality of touch electrodes arranged on a front surface of the display panel, and a touch driving circuit supplying driving signals to the touch electrodes through touch lines and detecting coordinates of a touch position of the touch sensing unit. The touch lines are formed and disposed in a rear surface direction of at least one touch electrode so as to overlap the at least one touch electrode of the touch electrodes. The touch electrodes are respectively connected to the touch lines through at least one touch contact hole, and the touch lines are formed of a same metal material on a same process layer as at least one electrode included in the plurality of pixels formed in the display area.

19 Claims, 26 Drawing Sheets

DISPLAY DEVICE HAVING TOUCH ELECTRODES AND BURIED TOUCH LINES BENEATH PLANARIZATIONAND BANK LAYERS

CROSS-REFERENCE TO RELATED APPLICATION(S)

This application claims priority to and the benefit of Korean Patent Application No. 10-2024-0031303 under 35 U.S.C. § 119, filed on Mar. 5, 2024, in the Korean Intellectual Property Office, the disclosure of which in its entirety is herein incorporated by reference.

BACKGROUND

1. Technical Field

The disclosure relates to a display device having a touch sensing function.

2. Description of the Related Art

As an information society develops, the demand for a display device for displaying an image is increasing in various forms. For example, display devices are applied to various electronic devices such as smartphones, digital cameras, laptop computers, navigation devices, and smart televisions.

A display device may be a flat panel display device such as a liquid crystal display device, a field emission display device, or an organic light emitting display device. Among flat panel display devices, the light emitting display device may include a light emitting element in which each of the pixels of a display panel may emit light by itself, thereby displaying an image without a backlight unit providing the light to the display panel.

In recent years, a display device includes a touch sensing module for sensing a user's touch as one of the interface mechanisms. The touch sensing module includes a touch sensing unit in which touch sensing electrodes are arranged, and a touch driving circuit for detecting a change in capacitance between the touch sensing electrodes. The touch sensing electrodes of the touch sensing unit are disposed in a touch sensing area corresponding to an image display area, and in an outer area defined as a bezel area, lines through which driving signals or sensing signals of the touch sensing electrodes are transmitted are disposed. In this case, area size of the outer area increases due to the lines connected to the touch sensing electrodes, which is undesirable.

SUMMARY

Aspects of the disclosure provide display device capable of minimizing or eliminating a size of an outer area by changing the arrangement position of touch signal lines that supply a driving signal or transmit touch sensing signals to touch sensing electrodes.

Aspects of the disclosure also provide a touch sensing module and a display device capable of reducing a bezel formation area while maintaining image display efficiency by improving the formation position and arrangement structure of touch signal lines electrically connected to touch sensing electrodes.

However, aspects of the disclosure are not restricted to those set forth herein. The above and other aspects of the disclosure will become more apparent to one of ordinary skill in the art to which the disclosure pertains by referencing the detailed description of the present disclosure given below.

According to an embodiment of the disclosure, a display device includes a display including a display area and a non-display area around the display area, the display panel including a plurality of pixels disposed in the display area, a touch sensing unit that includes a plurality of touch electrodes arranged on a front surface of the display panel, and a touch driving circuit supplying driving signals to the plurality of touch electrodes respectively through a plurality of touch lines and detecting coordinates of a touch position of the touch sensing unit, in which the plurality of touch lines are formed and disposed in a rear surface direction of at least one touch electrode so as to overlap the at least one touch electrode of the plurality of touch electrodes, the plurality of touch electrodes are respectively connected to the plurality of touch lines through at least one touch contact hole, and the plurality of touch lines are formed of a same metal material on a same process layer as at least one electrode included in the plurality of pixels formed in the display area.

In an embodiment, the plurality of touch electrodes are arranged in a matrix structure in plan view on a front surface of the display area, the plurality of touch lines may extend from the display area to the non-display area, and an end of each of the plurality of touch lines is electrically connected to at least one touch electrode of the plurality of touch electrodes through at least one touch contact hole, and another end is electrically connected to the touch driving circuit.

In an embodiment, the plurality of touch electrodes may include driving electrodes and sensing electrodes arranged alternately in a matrix structure in plan view on the front surface of the display area, the plurality of touch lines may extend from the display area to the non-display area, an end of each of a plurality of first touch lines of the plurality of touch lines is electrically connected to at least one driving electrode of the driving electrodes through at least one touch contact hole, and another end is electrically connected to the touch driving circuit, and an end of each of a plurality of second touch lines of the plurality of touch lines is electrically connected to at least one sensing electrode of the sensing electrodes through at least one touch contact hole, and another end is electrically connected to the touch driving circuit.

In an embodiment, the plurality of touch lines may be formed of a same metal material through a same process on a same process layer as a connection electrode of a thin film transistor or at least one of lines formed in the display area.

In an embodiment, the at least one touch contact hole may be formed to pass through at least one layer of at least one planarization layer, at least one organic or inorganic insulating layer, and at least one organic or inorganic protective layer and expose at least one touch line of the plurality of touch lines.

In an embodiment, the at least one touch contact hole may be formed to penetrate through at least one layer of the at least one planarization layer, the at least one organic or inorganic insulating layer, and the at least one organic or inorganic protective layer and at least one metal electrode and may expose at least one touch line of the plurality of touch lines.

In an embodiment, the plurality of pixels may include at least one first organic or inorganic insulating layer, a first anode electrode, a second organic or inorganic insulating layer, a second anode electrode, a planarization layer, a pixel electrode, a bank, and a common electrode formed by sequentially stacking on a front surface of at least one plurality of thin film transistors, and the plurality of touch lines may be formed of the same metal material through a same process on a same process layer as the pixel electrode, or may be formed of the same metal material through a same process on a same process layer as the first anode electrode or the second anode electrode.

In an embodiment, the plurality of touch electrodes may be respectively connected to the plurality of touch lines through at least one touch contact hole, and the at least one touch contact hole may be formed to penetrate through at least one layer of the at least one first organic or inorganic insulating layer, the second organic or inorganic insulating layer, the planarization layer, and the bank and the bank and may expose at least one touch line of the plurality of touch line.

In an embodiment, the at least one touch contact hole may be formed to penetrate through at least one layer or film of the at least one first organic or inorganic insulating layer, the second organic or inorganic insulating layer, the planarization layer, and the bank and the common electrode and may expose at least one touch line of the plurality of touch lines.

In an embodiment, a color filter layer may be further formed in a front direction of the touch sensing unit in which the plurality of touch electrodes are arranged.

According to an embodiment of the disclosure, a display device includes a display panel that includes a plurality of pixels disposed in a display area, a touch sensing unit that includes a plurality of touch electrodes arranged on a front surface of the display panel, a display driving circuit driving the plurality of pixels, and a touch driving circuit detecting coordinates of a touch position of the touch sensing unit, in which a plurality of touch lines are formed and disposed in the display area of the display panel so as to overlap at least one touch electrode of the plurality of touch electrodes, the plurality of touch electrodes are respectively connected to the plurality of touch lines through at least one touch contact hole, and the at least one touch contact hole is formed to pass through at least one layer of a planarization layer, at least one organic or inorganic insulating layer, and at least one organic or inorganic protective layer of the display area and expose the plurality of touch lines.

In an embodiment, the plurality of touch electrodes may be arranged in a matrix structure in plan view on a front surface of the display area, and the plurality of touch lines may extend from the display area to the non-display area, and an end of each of the plurality of touch lines may be electrically connected to at least one touch electrode of the plurality of touch electrodes through at least one touch contact hole, and another end may be electrically connected to the touch driving circuit.'

In an embodiment, the plurality of touch electrodes include driving electrodes and sensing electrodes may be arranged alternately in a matrix structure in plan view on the front surface of the display area, the plurality of touch lines may extend from the display area to the non-display area, an end of each of a plurality of first touch lines of the plurality of touch lines may be electrically connected to at least one driving electrode of the driving electrodes through at least one touch contact hole, and another end may be electrically connected to the touch driving circuit, and an end of each of a plurality of second touch lines of the plurality of touch lines may be electrically connected to at least one sensing electrode of the sensing electrodes through at least one touch contact hole, and another end may be electrically connected to the touch driving circuit.

In an embodiment, the plurality of touch lines may be formed of a same metal material through a same process on a same process layer as pixel electrodes included in the plurality of pixels formed in the display area, or may be formed of the same metal material through a same process on a same process layer as a connection electrode of a thin film transistor or at least one of lines formed in the display area.

In an embodiment, the plurality of touch electrodes may be respectively connected to the plurality of touch lines through at least one touch contact hole, and the at least one touch contact hole may be formed to penetrate through the at least one layer and expose at least one touch line of the plurality of touch lines.

In an embodiment, the at least one touch contact hole may be formed to penetrate through the at least one layer and at least one metal electrode and may expose at least one touch line of the plurality of touch lines.

In an embodiment, the plurality of pixels may include at least one first organic or inorganic insulating layer, a first anode electrode, a second organic or inorganic insulating layer, a second anode electrode, a planarization layer, a pixel electrode, a bank, and a common electrode may be formed by sequentially stacking on a front surface of at least one plurality of thin film transistors, and the plurality of touch lines may be formed of the same metal material through the same process on the same process layer as the pixel electrode, or may be formed of the same metal material through the same process on the same process layer as the first anode electrode or the second anode electrode.

In an embodiment, the plurality of touch electrodes may be respectively connected to the plurality of touch lines through at least one touch contact hole, and the at least one touch contact hole may be formed to penetrate through at least one layer or film of the at least one first organic or inorganic insulating layer, the second organic or inorganic insulating layer, the planarization layer, and the bank and may expose at least one touch line of the plurality of touch lines.

The display device having the touch sensing function according to an embodiment may minimize or eliminate the size of the outer area of the touch sensing area by improving the arrangement position of the touch signal lines that supply the driving signal or transmit the touch sensing signals to the touch sensing electrodes.

The display device may reduce the bezel formation area while maintaining the image display efficiency by disposing the touch sensing electrodes and the touch signal line to overlap the touch sensing area.

However, the effects of the embodiments are not restricted to the one set forth herein. The above and other effects of the embodiments will become more apparent to one of daily skill in the art to which the embodiments pertain by referencing the claims.

BRIEF DESCRIPTION OF THE DRAWINGS

In the drawings, the sizes, thicknesses, ratios, and dimensions of the elements may be exaggerated for ease of description and for clarity. Like reference numbers and/or like reference characters refer to like elements throughout. The above and other aspects and features of the disclosure will become more apparent by describing in detail embodiments thereof with reference to the attached drawings, in which:

FIG. 5 is a cross-sectional view partially illustrating the cross-sectional arrangement structure of pixels, a touch sensing electrode, and a touch signal line of the display panel illustrated in FIGS. 1 and 2 according to the first embodiment;

FIG. 10 is a cross-sectional view partially illustrating the cross-sectional arrangement structure of pixels, a touch sensing electrode, and a touch signal line of the display panel illustrated in FIGS. 1 and 2 according to a second embodiment;

FIG. 12 is a cross-sectional view for describing a process of forming pixel electrodes of the pixels, a common electrode, and the touch signal lines illustrated in FIG. 11;

DETAILED DESCRIPTION OF THE EMBODIMENTS

Figure 1:
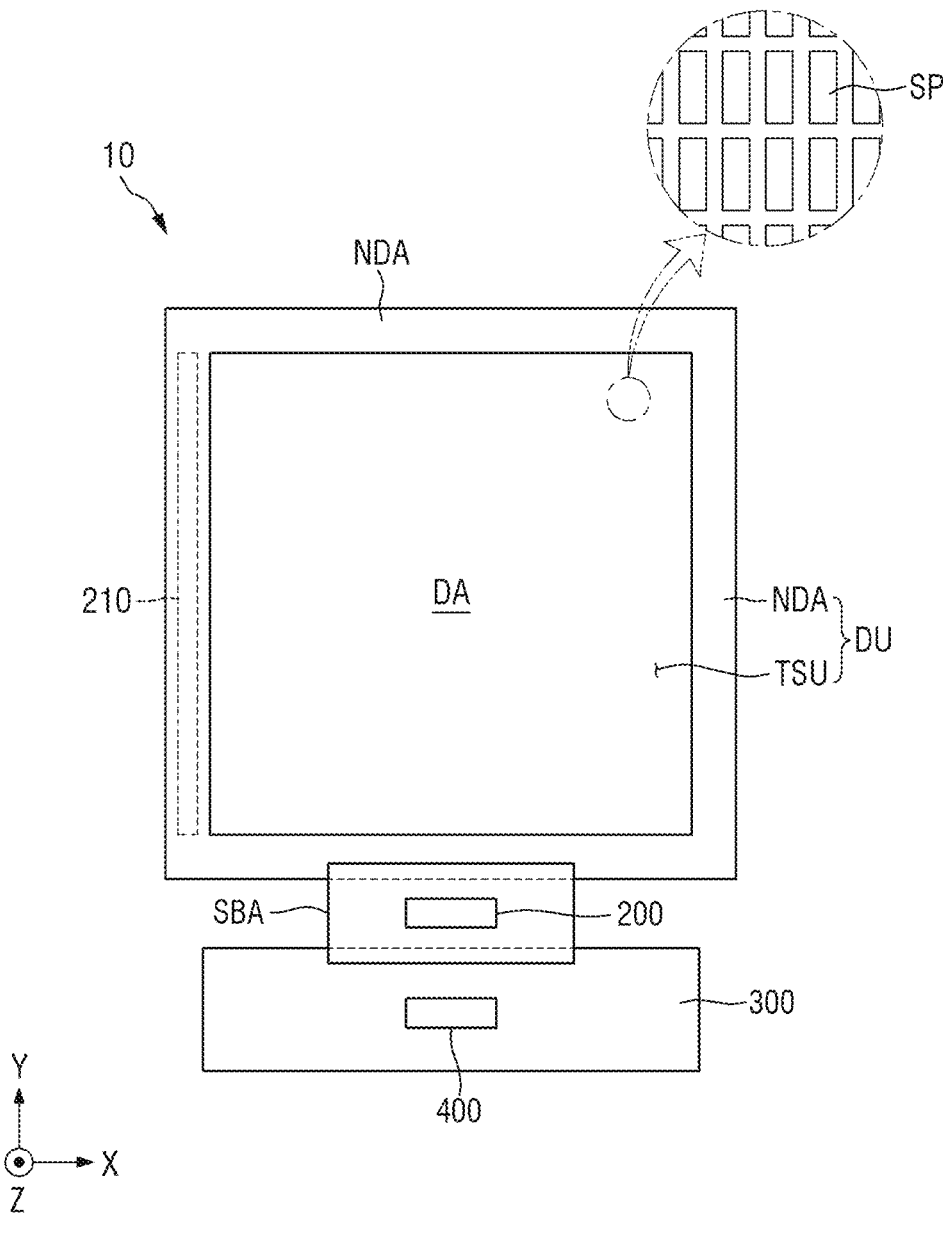
FIG. 1 is a plan view illustrating a configuration of a display device according to an embodiment of the disclosure that is constructed according to principles of the disclosure.

Embodiments of the disclosure will now be described more fully hereinafter with reference to the accompanying drawings. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing illustrative features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some illustrative embodiments may be physically separated into two or more interacting and discrete blocks, units, and/or modules without departing from the scope of the inventive concepts. Further, the blocks, units, and/or modules of some illustrative embodiments may be physically combined into more complex blocks, units, and/or modules without departing from the scope of the inventive concepts.

Each of the features of the various embodiments may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 2:
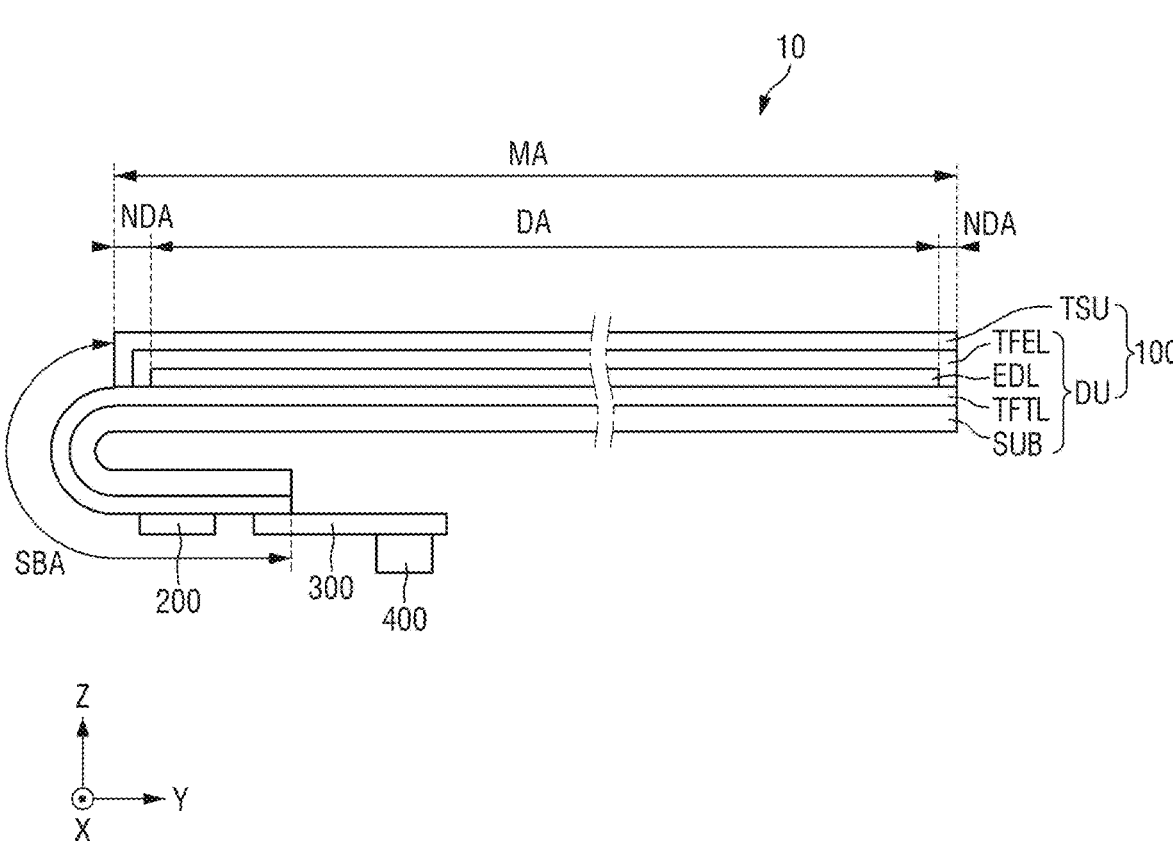
FIG. 2 is a side cross-sectional view illustrating the display device of FIG. 1 in detail.

FIG. 1 is a plan view illustrating a configuration of a display device according to an embodiment. FIG. 2 is a side cross-sectional view specifically illustrating the display device of FIG. 1.

Referring to FIGS. 1 and 2, a display device 10 according to an embodiment may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied to a display unit of a television, a laptop computer, a monitor, a billboard, or the Internet of Things (IOT). As another example, the display device 10 may also be applied to wearable devices such as a smart watch, a watch phone, a glasses-type display, and a head mounted display (HMD).

The display device 10 according to an embodiment may be variously classified according to a display method. For example, the display device 10 may be classified into and include an organic light emitting diode display (OLED), an inorganic light emitting display (inorganic EL), a quantum dot light emitting display (QED), a micro LED display (micro-LED), a nano LED display (nano-LED), a plasma display panel (PDP), a field emission display (FED), a liquid crystal display (LCD), an electrophoretic display (EPD), and the like. Hereinafter, an organic light emitting diode display (OLED) will be described as an example of the display device 10 according to an embodiment, and unless a special distinction is required, the organic light emitting diode display (OLED) applied to the embodiment will be abbreviated as the display device 10. The display device 10 according to the embodiment is not limited to the organic light emitting diode display (OLED), and other display devices listed above or known in the art may be applied within the scope of sharing technical ideas.

The display device 10 according to an embodiment may have a rectangular shape, a square shape, a circular shape, an elliptical shape, or a quadrate shape in plan view. For example, when the display device 10 is a mobile device such as a tablet PC, the display device 10 may have a rectangular shape with a long side positioned in a horizontal direction. However, the disclosure is not limited thereto, and the long side of the display device 10 may be positioned in a vertical direction, and the display device 10 may be rotatably installed, such that the long side of the display device 10 may also be variably positioned in the horizontal or vertical direction.

The display device 10 may include a display panel 100, a display driving circuit 200, and a touch sensing module including a touch sensing unit TSU and a touch driving circuit 400.

Specifically, the display panel 100 of the display device 10 may include a display unit DU for displaying an image, and the touch sensing unit TSU for sensing a touch of a body portion such as a finger and an electronic pen may be disposed on the display panel 100. The display unit DU of the display panel 100 may include a plurality of pixels SP and display an image through the plurality of pixels SP. For example, the touch sensing unit TSU may be mounted on a front surface of the display panel 100 or formed integrally with the display panel 100. The touch sensing unit TSU may include a plurality of touch electrodes and may sense a touch and a touch position using a voltage magnitude change detection method or a capacitance detection method using the touch electrodes.

The display driving circuit 200 may output signals and voltages for driving the pixels SP of the display unit DU. The display driving circuit 200 may supply data voltages to data lines to which the pixels SP may be connected. The display driving circuit 200 may supply a power voltage to a power line and may supply gate control signals to a gate driver 210.

The touch driving circuit 400 may be electrically connected to the touch sensing unit TSU. The touch driving circuit 400 may supply touch driving signals to the plurality of touch electrodes arranged in the touch sensing unit TSU, and may determine whether the user has touched the display device and calculate the coordinates of a touch location by sensing a change in voltage magnitude of the driving signals supplied to the touch electrodes. As another example, the touch driving circuit 400 may supply driving signals to the plurality of touch electrodes arranged in the touch sensing unit TSU, and may sense an amount of change in capacitance between the plurality of touch electrodes. The touch driving circuit 400 may determine whether a user's touch is input and calculate the touch coordinates based on the amount of change in capacitance between the plurality of touch electrodes.

The display driving circuit 200 may operate as a main processor or may be formed integrally with the main processor. Accordingly, the display driving circuit 200 may control the overall function of the display device 10. For example, the display driving circuit 200 may receive touch data from the touch driving circuit 400, determine the user's touch coordinates, and then generate digital video data according to the touch coordinates. For example, the display driving circuit 200 may execute an application indicated by an icon displayed on the user's touch coordinates. As still another example, the display driving circuit 200 may receive coordinate data from an electronic pen or the like, determine touch coordinates of the electronic pen, and then generate digital video data according to the touch coordinates, or also execute an application indicated by an icon displayed on the touch coordinates of the electronic pen.

Referring to FIGS. 1 and 2, the display panel 100 may be divided into a main area MA and a sub-area SBA. The main area MA may include a display area DA having pixels SP displaying an image, and a non-display area NDA disposed around the display area DA. In the display area DA, light may be emitted from light emitting areas or opening areas of each pixel SP to display an image. To this end, the pixels SP of the display area DA may include a pixel circuit including switching elements, a pixel defining layer defining the light emitting area or the opening area, and a light emitting element.

The non-display area NDA may be an area outside the display area DA. The non-display area NDA may be defined as an edge area of the main area MA of the display panel 100. The non-display area NDA may include a gate driver 210 supplying gate signals to gate lines connected to the pixels SP in the display area DA, and fan-out lines connecting the display driving circuit 200 and the display area DA.

The sub-area SBA may extend from one side of the main area MA, or may be attached to one side of the main area MA. The sub-area SBA may include a flexible material that may be bent, folded, rolled, or the like. For example, in case that the sub-area SBA is bent, the sub-area SBA may overlap the main area MA in a thickness direction (Z-axis direction), as shown in FIG. 2. The sub-area SBA may include the display driving circuit 200 and a pad portion connected to a circuit board 300. Optionally, the sub-area SBA may be omitted in some implementations of this embodiment, and the display driving circuit 200 and the pad portion may be disposed in and attached to the non-display area NDA in some implementations of this embodiment.

At least one display driving circuit 200 may be formed as an integrated circuit (IC), and may be mounted and disposed in the sub-area SBA. As another example, the display driving circuits 200 may be mounted on the display panel 100 by a chip on glass (COG) method, a chip on plastic (COP) method, or an ultrasonic bonding method. For example, the display driving circuit 200 may be mounted in the sub-area SBA, and may overlap the main area MA in the thickness direction (Z-axis direction), which is a rear direction, by bending of the sub-area SBA. As another example, the display driving circuit 200 may also be mounted on the circuit board 300.

The circuit board 300 may be attached to the display panel 100 or the pad portion of the sub-area SBA using an anisotropic conductive film (ACF). Lead lines of the circuit board 300 may be electrically connected to the display panel 100 or the pad portion of the sub-area SBA. The circuit board 300 may be a flexible film such as a flexible printed circuit board, a printed circuit board, or a chip on film.

The touch driving circuit 400 may be disposed on a separate circuit board 300. The touch driving circuit 400 may be formed as an integrated circuit (IC). As described above, the touch driving circuit 400 may determine whether the user has touched the display device and calculate the coordinates of the touch location by applying the touch driving signals to each of the touch electrodes of the touch sensing unit TSU and sensing the change in the voltage magnitude (or amount of current) of the touch driving signals applied to each of the touch electrodes. More specifically, the touch driving circuit 400 may determine whether the user has touched the display device and extract the coordinates of the touch by sequentially or simultaneously supplying the touch driving signals to the touch electrodes arranged side by side in a matrix form in the touch sensing unit TSU and detecting the amount of change in the voltage magnitude of the touch driving signals applied to each of the touch electrodes.

As another example, the touch driving circuit 400 may determine whether the user has touched the display device and calculate the coordinates of the touch location by supplying the touch driving signals to the first touch electrodes of the touch sensing unit TSU and measuring an amount of charge change in mutual capacitance of each of a plurality of touch nodes formed between the touch electrodes. Specifically, the touch driving circuit 400 may measure a change in capacitance of the touch nodes according to a change in voltage magnitude or an amount of current of the touch sensing signals each received from the touch electrodes. In this way, the touch driving circuit 400 may determine whether or not the user has touched the display device, whether or not the user has approached the display device, and the like, according to the amount of charge change in the mutual capacitance of each of the touch nodes. The touch driving signals supplied to each touch electrode may be pulse signals with a selected (e.g., certain) frequency. Accordingly, the touch driving circuit 400 may detect whether the user has touched the display device by sequentially or simultaneously supplying the touch driving signals to the touch electrodes arranged side by side in a matrix form in the touch sensing unit TSU, and sequentially measuring the amount of charge change in the capacitance of each of the touch nodes formed by the touch electrodes.

The substrate SUB of the display panel 100 illustrated in FIG. 2 may be a base substrate or a base member. The substrate SUB may be a flexible substrate that may be bent, folded, rolled, or the like. For example, the substrate SUB may include a glass material or a metal material, but is not limited thereto. As another example, the substrate SUB may include a polymer resin such as polyimide (PI).

A thin film transistor layer TFTL may be disposed on the substrate SUB. The thin film transistor layer TFTL may include a plurality of thin film transistors constituting the pixel circuit of the pixels SP. The thin film transistor layer TFTL may further include gate lines, data lines, power lines, gate control lines, fan-out lines connecting the display driving circuit 200 and the data lines, and lead lines connecting the display driving circuit 200 and the pad portion. When the gate driver 210 is formed on one side of the non-display area NDA of the display panel 100, the gate driver 210 may also include the thin film transistors.

The thin film transistor layer TFTL may be disposed in the display area DA, the non-display area NDA, and the sub-area SBA. The thin film transistors, the gate lines, the data lines, and the power lines of each of the pixels of the thin film transistor layer TFTL may be disposed in the display area DA. The gate control lines and the fan-out lines of the thin film transistor layer TFTL may be disposed in the non-display area NDA. The lead lines of the thin film transistor layer TFTL may be disposed in the sub-area SBA.

A light emitting element layer EDL may be disposed on the thin film transistor layer TFTL. The light emitting element layer EDL may include a plurality of light emitting elements disposed between the pixel electrode of each pixel SP and the common electrode and emitting light according to a voltage difference between the pixel electrode and the common electrode, and a pixel defining layer that defines each pixel area or pixel SP The light emitting elements of each pixel SP may be disposed in the light emitting area for each pixel SP.

An encapsulation layer TFEL may cover an upper surface and side surfaces of the light emitting element layer EDL, and may protect the light emitting element layer EML. The encapsulation layer TFEL may include at least one inorganic layer or at least one organic layer for encapsulating the light emitting element layer EML.

The touch sensing unit TSU may be disposed on the encapsulation layer TFEL. The touch sensing unit TSU may include a plurality of touch electrodes arranged in a matrix structure in plan view, and touch lines electrically connecting the plurality of touch electrodes to the touch driving circuit 400, respectively. On the other hand, the plurality of touch electrodes may also be arranged and disposed to sense the user's touch in a capacitive manner. For example, the touch electrodes of the touch sensing unit TSU may sense the user's touch in a self-capacitance manner or a mutual capacitance manner.

As another example, the touch sensing unit TSU may be disposed on a separate substrate disposed on the display unit DU. In this case, the substrate supporting the touch sensing unit TSU may be a base member that encapsulates the display unit DU.

The plurality of touch electrodes included in the touch sensing unit TSU may be disposed in a touch sensor area overlapping the display area DA. For example, the touch lines of the touch sensing unit TSU may also be disposed in the touch sensor area to overlap at least one touch electrode of the plurality of touch electrodes. The touch lines may be formed and disposed in a rear direction of at least one touch electrode so as to overlap the at least one touch electrode of the plurality of touch electrodes. For example, each touch electrode may be electrically connected to each touch line through a contact hole. Specifically, the plurality of touch lines may extend from the display area DA to the non-display area NDA, and one end of each of the plurality of touch lines may be electrically connected to at least one touch electrode of the plurality of touch electrodes through at least one touch contact hole. On the other hand, the other end of each of the plurality of touch lines may be electrically connected to the touch driving circuit 400.

Figure 3:
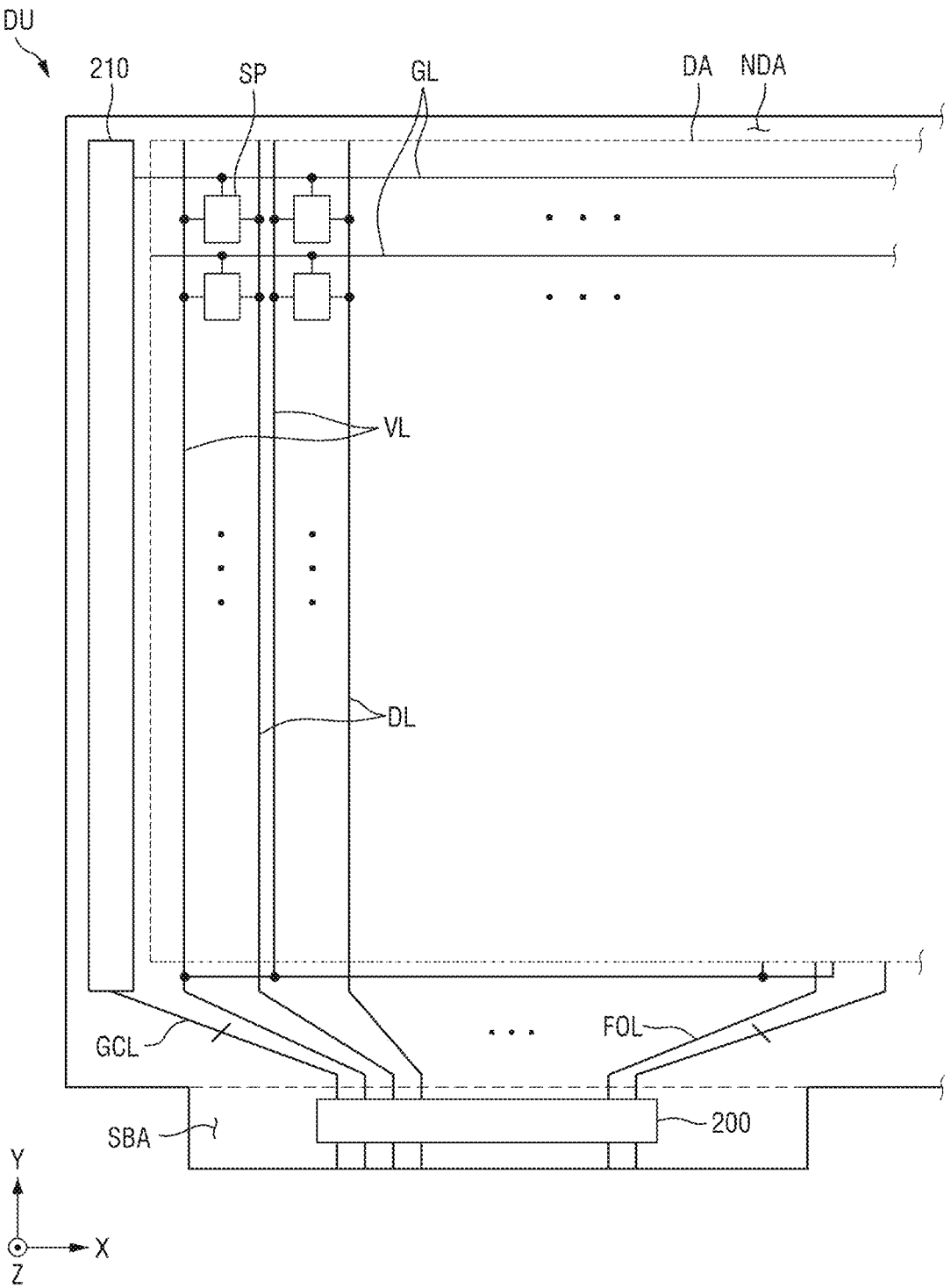
FIG. 3 is a layout view schematically illustrating an example of a display panel according to an embodiment.

FIG. 3 is a layout view schematically illustrating an example of a display panel according to an embodiment. Specifically, FIG. 3 is a layout view illustrating a display area DA and a non-display area NDA of the display unit DU before the touch sensing unit TSU is formed.

The display area DA, which is an area displaying an image, may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit for outputting light.

The plurality of gate lines GL may supply a gate signal received from a gate driver 210 to the plurality of pixels SP. The plurality of gate lines GL may extend in an X-axis direction and may be spaced apart from each other in a Y-axis direction intersecting the X-axis direction.

The plurality of data lines DL may supply the data voltages received from the display driving circuit 200 to the plurality of pixels SP. The plurality of data lines DL may extend in the Y-axis direction and may be spaced apart from each other in the X-axis direction.

The plurality of power lines VL may supply the power voltage received from the display driving circuit 200 to the plurality of pixels SP. Here, the power voltage may be at least one of a driving voltage, an initialization voltage, and a reference voltage. The plurality of power lines VL may extend in the Y-axis direction and may be spaced apart from each other in the X-axis direction.

The non-display area NDA may surround the display area DA. The non-display area NDA may include a gate driver 210, fan-out lines FOL, and gate control lines GCL. The gate driver 210 may generate a plurality of gate signals based on the gate control signals, and may sequentially supply the plurality of gate signals to the plurality of gate lines GL according to a set order.

The fan-out lines FOL may extend from the display driving circuit 200 to the display area DA. The fan-out lines FOL may supply the data voltage received from the display driving circuit 200 to the plurality of data lines DL.

The gate control line GCL may extend from the display driving circuit 200 to the gate driver 210. The gate control line GCL may supply the gate control signal received from the display driving circuit 200 to the gate driver 210.

The display driving circuit 200 may output signals and voltages for driving the display panel 100 to the fan-out lines FOL. The display driving circuit 200 may supply the data voltage to the data lines DL through the fan-out lines FOL. The data voltage may be supplied to the plurality of pixels SP and may determine luminance of the plurality of pixels SP. The display driving circuit 200 may supply the gate control signals to the gate driver 210 through the gate control line GCL.

Figure 4:
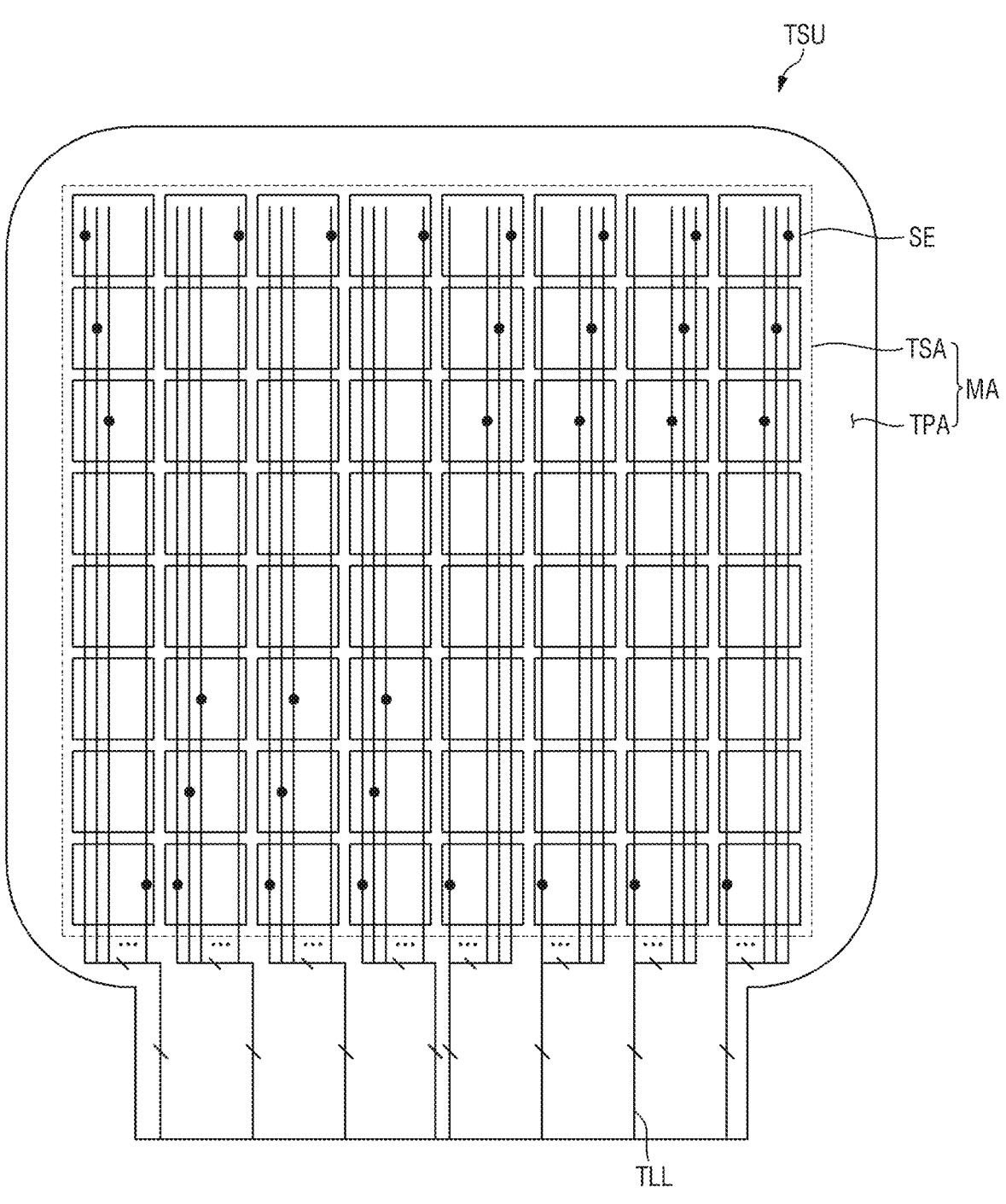
FIG. 4 is a layout view schematically illustrating the arrangement structure of touch sensing electrodes and touch signal lines according to a first embodiment of the disclosure.

FIG. 4 is a layout view schematically illustrating the arrangement structure of touch sensing electrodes and touch signal lines according to a first embodiment.

Referring to FIG. 4, a plurality of touch electrodes SE may be formed and arranged in a matrix structure in plan view in a touch sensing area TSA of the touch sensing unit TSU. Each of the touch electrodes SE may be connected to each of a touch lines TLL formed in a rear direction of the touch electrodes SE in a one-to-one manner through at least one touch contact hole. In other words, each touch electrode SE may be electrically connected to each touch line TLL through a plurality of touch contact holes.

Each touch line TLL may be formed and disposed in the display area DA and the non-display area NDA of the display panel 100. Each touch line TLL may be formed of the same metal material through the same process on the same process layer as the pixel electrodes of the pixels SP formed in the display area DA. As an example, each touch line TLL may be formed of the same metal material through the same process on the same process layer as connection electrodes, connection lines, or contact electrodes of the pixels SP in addition to the pixel electrodes of the pixels SP formed in the display area DA. Each touch line TLL may be formed to have the same length. Each touch line TLL may be formed to have the same width, thickness, or length within a range that may minimize resistance size and RC delay and improve visibility.

Each touch electrode SE may be electrically connected to each touch line TLL through at least one touch contact hole formed to pass through at least one layer of at least one insulating layer, at least one planarization layer, or at least one protective layer forming layer.

The touch driving circuit 400 may simultaneously or sequentially apply a touch driving signal to each of the touch electrodes SE through each of the touch lines TLL during a preset first period (e.g., at least one frame period). The touch driving circuit 400 may determine whether the user has touched the display device and calculate the coordinates of the touch location by measuring an amount of charge change in mutual capacitance of each of a plurality of touch nodes formed between the touch electrodes during a preset second period (e.g., at least one frame period). Specifically, the touch driving circuit 400 may measure a change in capacitance of the touch nodes according to a change in voltage magnitude or an amount of current of the touch sensing signals each received from the touch electrodes.

As another example, the touch driving circuit 400 may simultaneously or sequentially supply the touch driving signal to each of the touch electrodes SE through each of the touch lines TLL during a preset first period (e.g., at least one frame period). Each of the touch electrodes SE receives the touch driving signal from the touch driving circuit 400 during the first period through each of the touch lines TLL connected in a one-to-one manner. The voltage magnitude of the touch driving signal applied to each of the touch electrodes SE varies when the user's touch is sensed. Thereafter, the touch driving circuit 400 detects an amount of change in the voltage magnitude of the touch electrodes SE through each of the touch lines TLL during the preset second period (e.g., at least one frame period). The touch driving circuit 400 may generate a touch position and coordinates of the touch position according to the amount of change in the voltage magnitude for each touch electrode SE.

Figure 5:
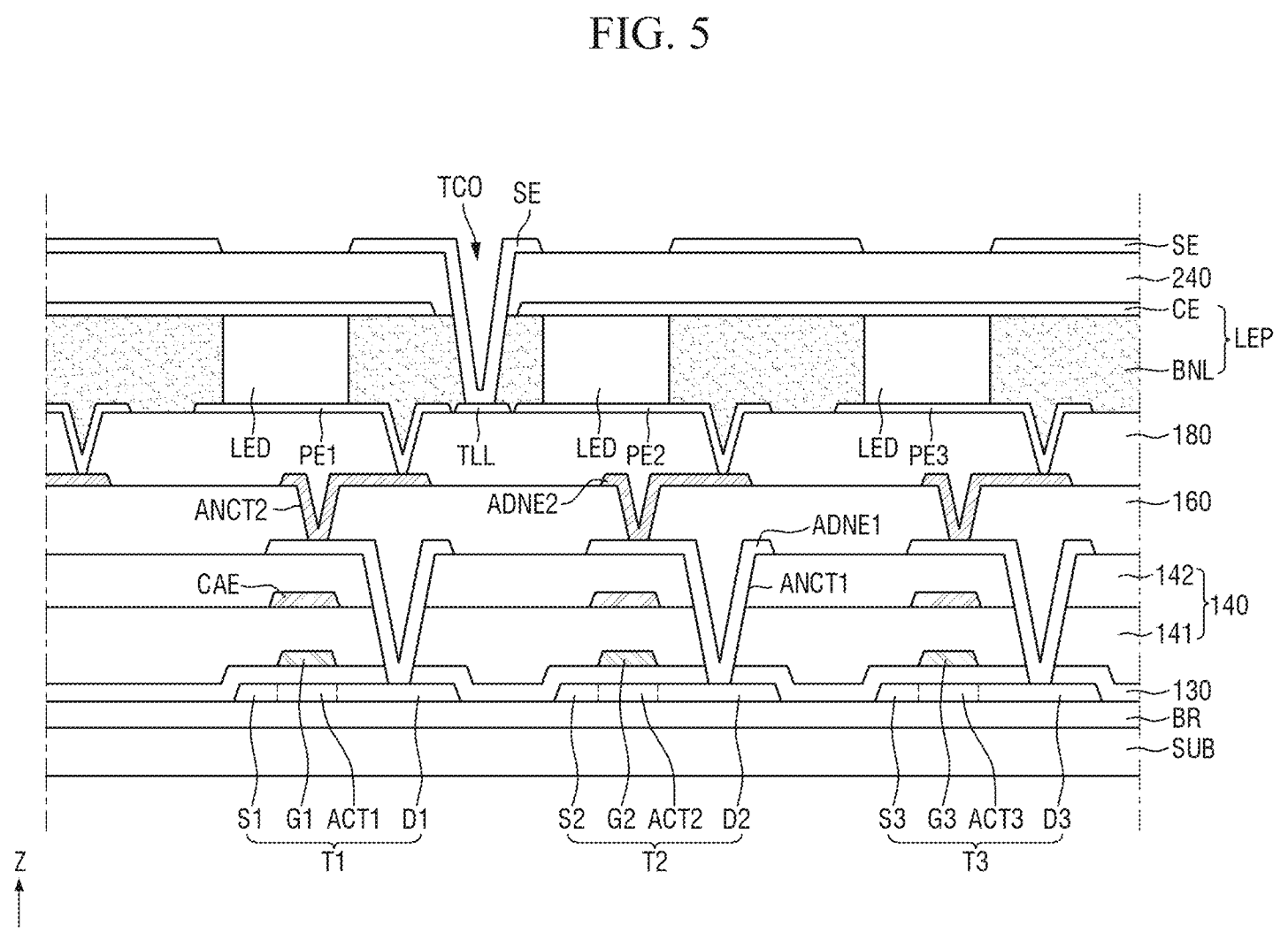

FIG. 5 is a cross-sectional view partially illustrating the cross-sectional arrangement structure of pixels, a touch sensing electrode, and a touch signal line of the display panel illustrated in FIGS. 1 and 2 according to the first embodiment.

Referring to FIG. 5, a barrier layer BR may be disposed on the substrate SUB of the display panel 100. The substrate SUB may include an insulating material such as polymer resin and may be formed of polyimide. Here, the substrate SUB may be a flexible substrate that may be bent, folded, rolled, or the like.

The barrier layer BR is a film for protecting thin film transistors T1, T2, and T3 and a light emitting element portion LEP of each pixel SP from moisture permeating through the substrate SUB, which is vulnerable to moisture permeation. The barrier layer BR may include a plurality of inorganic layers alternately stacked. For example, the barrier layer BR may be formed as a multi-layer in which one or more inorganic layers of a silicon nitride layer, a silicon oxynitride layer, a silicon oxide layer, a titanium oxide layer, and an aluminum oxide layer may be alternately stacked.

The transistors T1, T2, and T3 of each pixel SP may be disposed on the barrier layer BR. Each of the thin film transistors T1, T2, and T3 may include an active layer ACT1/ACT2/ACT3, a gate electrode G1/G2/G3, a source electrode S1/S2/S2, and a drain electrode D1/D2/D3, respectively. The active layer ACT1 overlapping the gate electrode G1 in the third direction (Z-axis direction), which is the thickness direction of the substrate SUB, may be defined as a channel region.

A gate insulating layer 130 may be disposed on the active layer ACT1, the source electrode S1, and the drain electrode D1 of the thin film transistors T1, T2, and T3. The gate insulating layer 130 may be formed as an inorganic layer, for example, a silicon nitride layer, a silicon oxynitride layer, a silicon oxide layer, a titanium oxide layer, or an aluminum oxide layer.

The gate electrode G1 of the thin film transistors T1, T2, and T3 may be disposed on the gate insulating layer 130. The gate electrode G1 may overlap the active layer ACT1 in the third direction (Z-axis direction). The gate electrode G1 may be formed as a single layer or a multi-layer made of any one of molybdenum (Mo), aluminum (Al), chromium (Cr), gold (Au), titanium (Ti), nickel (Ni), neodymium (Nd), and copper (Cu), or an alloy thereof.

A first interlayer insulating layer 141 may be disposed on the gate electrode G1 of the thin film transistors T1, T2, and T3. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may be formed as a plurality of inorganic layers.

A capacitor electrode CAE may be disposed on the first interlayer insulating layer 141. The capacitor electrode CAE may overlap the gate electrode G1 of the thin film transistors T1, T2, and T3 in the third direction (Z-axis direction). Since the first interlayer insulating layer 141 has a predetermined dielectric constant, a capacitor may be formed by the capacitor electrode CAE, the gate electrode G1, and the first interlayer insulating layer 141 disposed between the capacitor electrode CAE and the gate electrode G1.

A second interlayer insulating layer 142 may be disposed on the capacitor electrode CAE. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may be formed as a plurality of inorganic layers. The first interlayer insulating layer 141 and the second interlayer insulating layer 142 collectively form an insulating layer 140, as shown in FIG. 5.

A first anode connection electrode ADNE1 may be disposed on the second interlayer insulating layer 142. The first anode connection electrode ADNE1 may be connected to the drain electrode D1 of the thin film transistor T1 through a first connection contact hole ANCT1 penetrating through the gate insulating layer 130, the first interlayer insulating layer 141, and the second interlayer insulating layer 142. The first anode connection electrode ADNE1 may be formed of a single layer or a multi-layer made of any one of molybdenum (Mo), aluminum (Al), chromium (Cr), gold (Au), titanium (Ti), nickel (Ni), neodymium (Nd), and copper (Cu), or an alloy thereof.

A first planarization layer 160 for planarizing a level difference caused by the thin film transistors T1, T2, and T3 may be disposed on the first anode connection electrode ADNE1. The first planarization layer 160 may be formed as an organic layer made of an acryl resin, an epoxy resin, a phenolic resin, a polyamide resin, a polyimide resin, or the like.

A second anode connection electrode ADNE2 may be disposed on the first planarization layer 160. The second anode connection electrode ADNE2 may be connected to the first anode connection electrode ADNE1 through a second connection contact hole ANCT2 penetrating through the first planarization layer 160. The second anode connection electrode ADNE2 may be formed as a single layer or a multi-layer made of any one of molybdenum (Mo), aluminum (Al), chromium (Cr), gold (Au), titanium (Ti), nickel (Ni), neodymium (Nd), and copper (Cu), or an alloy thereof.

The second planarization layer 180 may be disposed on the second anode connection electrode ADNE2. The second planarization layer 180 may be formed as an organic layer made of an acryl resin, an epoxy resin, a phenolic resin, a polyamide resin, a polyimide resin, or the like.

A light emitting element portion LEP may be formed on the second planarization layer 180. The light emitting element portion LEP may include a plurality of pixel electrodes PE1, PE2, and PE3, a plurality of light emitting elements LE, a common electrode CE, and a plurality of touch lines TLL formed on the same process layer as the plurality of pixel electrodes PE1, PE2, and PE3.

Each of the touch lines TLL may be formed of the same metal material through the same process on the same process layer as the plurality of pixel electrodes PE1, PE2, and PE3.

The plurality of pixel electrodes PE1, PE2, and PE3 may include a first pixel electrode PE1, a second pixel electrode PE2, and a third pixel electrode PE3. The first pixel electrode PE1, the second pixel electrode PE2, and the third pixel electrode PE3 may serve as a first electrode of the light emitting element LE and may be an anode electrode or a cathode electrode. Each pixel electrode PE1, PE2, and PE3 may be formed in the light emitting area of each pixel SP. For example, each touch line TLL may be formed and disposed along an area between adjacent pixel electrodes of the plurality of pixel electrodes PE1, PE2, and PE3.

The plurality of pixel electrodes PE1, PE2, and PE3 and the touch lines TLL may be reflective alloy electrodes such as titanium (Ti), copper (Cu), or titanium (Ti) and copper (Cu). For example, the plurality of pixel electrodes PE1, PE2, and PE3 and the touch lines TLL may be formed in a stacked film structure of titanium (Ti) and copper (Cu). Here, the plurality of pixel electrodes PE1, PE2, and PE3 and the touch lines TLL may also have a stacked film structure in which a material layer having a high work function made of titanium oxide ($TiO_2$), indium tin oxide (ITO), indium zinc oxide (IZO), zinc oxide (ZnO), indium tin zinc oxide (ITZO), or magnesium oxide (MgO) and a reflective material layer made of silver (Ag), magnesium (Mg), aluminum (Al), platinum (Pt), lead (Pd), gold (Au), nickel (Ni), neodymium (Nd), iridium (Ir), chromium (Cr), lithium (Li), calcium (Ca), titanium (Ti), copper (Cu), or a mixture thereof may be stacked.

The plurality of pixel electrodes PE1, PE2, and PE3 may be disposed close to the light emitting element LED by having the material layer with the high work function disposed above the reflective material layer. The plurality of pixel electrodes PE1, PE2, and PE3 and the touch lines TLL may have a multilayer structure of ITO/Mg, ITO/MgF, ITO/Ag, and ITO/Ag/ITO, but are not limited thereto.

A bank BNL may be positioned on the plurality of pixel electrodes PE1, PE2, and PE3 and the touch lines TLL. The bank BNL may include openings that expose the first pixel electrode PE1, the second pixel electrode PE2, the third pixel electrode PE3, and the touch lines TLL, respectively. The bank BNL defines light emitting areas of each pixel SP and a non-light emitting area, which is an area between the light emitting areas. For example, a touch contact hole TCO formation area that connects the touch electrodes SE of each of the touch lines TLL with each touch line TLL in a one-to-one manner is defined in the bank BNL.

The bank BNL may include an organic insulating material, and may include, for example, a polyacrylates resin, an epoxy resin, a phenolic resin, a polyamides resin, a polyimides resin, an unsaturated polyesters resin, a polyphenyleneethers resin, a polyphenylenesulfides resin, or benzocyclobutene (BCB). A black matrix layer for blocking light may be further formed on a front surface of the bank BNL, that is, on the front surface of the bank BNL that overlaps the bank BNL.

A plurality of light emitting elements LED may be disposed on the first pixel electrode PE1, the second pixel electrode PE2, and the third pixel electrode PE3. Each light emitting element LED may be disposed in a light emitting area in which a pixel electrode for each pixel SP is formed.

Each light emitting element LED may be a vertical light emitting diode element extending to be elongated in the third direction (Z-axis direction). For example, a length of the light emitting element LED in the third direction (Z-axis direction) may be greater than a length of the light emitting element LED in a horizontal direction. The length of the light emitting element LED in the third direction (Z-axis direction) may be about 1 to 5 μm.

The light emitting element LED may have a cylindrical shape, a disk shape, or a rod shape with a width greater than a height. However, the disclosure is not limited thereto, and the light emitting element LED may have a shape such as a rod shape, a wire shape, or a tube shape, or a polygonal prism shape such as a cube shape, a rectangular parallelepiped shape, or a hexagonal prism shape, or may have various shapes such as a shape extending in one direction and having an outer surface partially inclined.

A common electrode CE that electrically connects all light emitting elements LED may be formed in a front direction of the light emitting element portion LEP including the light emitting elements LED. The common electrode CE may be in common contact with electrodes on one side of all light emitting elements LED and applies a common voltage of a preset voltage level to the light emitting elements LED. The disclosure is not limited thereto, and the common electrode CE may be a Schottky connection electrode. The common electrode CE may be formed in a flat shape including a plurality of openings or may be formed in a mesh structure in plan view. The common electrode CE may include titanium oxide ($TiO_2$), indium tin oxide (ITO), indium zinc oxide (IZO), zinc oxide (ZnO), indium tin zinc oxide (ITZO), or magnesium oxide (MgO).

A planarization layer 240 may be disposed on the front surface of the light emitting element portion LEP including the common electrode CE. The planarization layer 240 may planarize a level difference between an upper portion and a lower portion so that the touch electrode SE, which will be described later, may be formed. The planarization layer 240 may include a polyacrylates resin, an epoxy resin, a phenolic resin, a polyamides resin, a polyimides resin, an unsaturated polyesters resin, a polyphenyleneethers resin, a polyphenylenesulfides resin, benzocyclobutene (BCB), or the like.

At least one touch contact hole TCO may be formed in the planarization layer 240 so that each of the touch electrodes SE may be connected to each of the touch lines TLL formed in a rear direction of the touch electrodes SE in a one-to-one manner.

A plurality of touch electrodes SE may be formed on the front surface of the planarization layer 240 in a matrix structure in plan view. In this case, each of the touch electrodes SE may be electrically connected to each of the touch lines TLL through at least one touch contact hole TCO formed to pass through at least one layer or electrode of at least one interlayer insulating layer or insulating layer, a planarization layer, a protective layer, at least one metal electrode, and at least one bank BNL. Specifically, each of the touch electrodes SE may be electrically connected to each of the touch lines TLL through at least one touch contact hole TCO formed to pass through at least one planarization layer 240, the common electrode CE, and the bank BNL. Here, the plurality of touch electrodes SE may be made of any one of molybdenum (Mo), aluminum (Al), chromium (Cr), gold (Au), titanium (Ti), nickel (Ni), neodymium (Nd), and copper (Cu), or an alloy thereof. The touch electrodes SE may also be formed of multiple layers.

The touch driving circuit 400 may generate a touch position and coordinates of the touch position according to an amount of change in voltage magnitude for each touch electrode SE by supplying a touch driving signal to each of the touch electrodes SE through the touch lines TLL during the first period, and detecting the amount of change in the voltage magnitude of the touch electrodes SE through each of the touch lines TLL during the second period.

Figure 6:
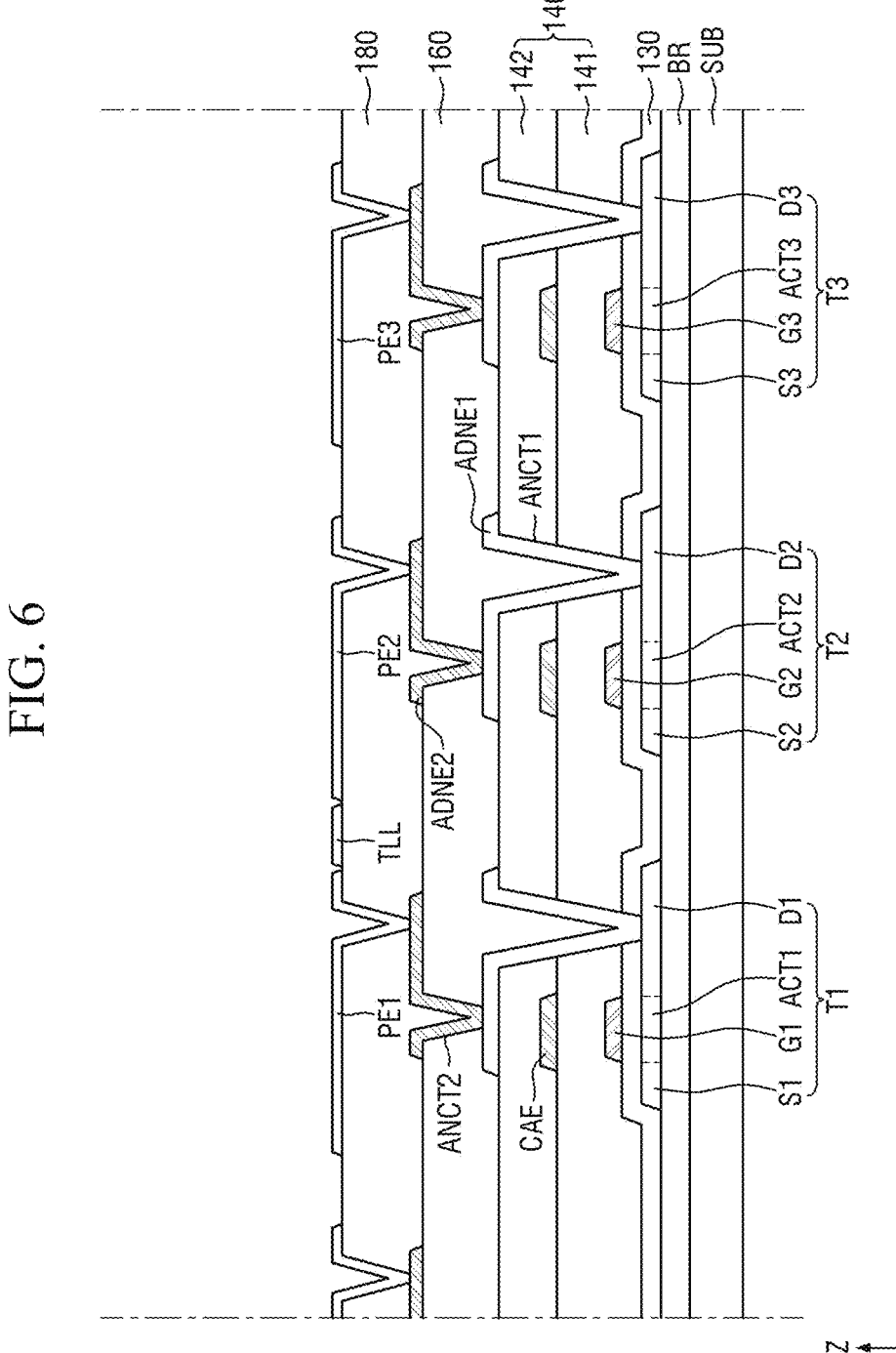
FIG. 6 is a cross-sectional view for describing a process of forming pixel electrodes of the pixels and the touch signal lines illustrated in FIG. 5.
Figure 7:
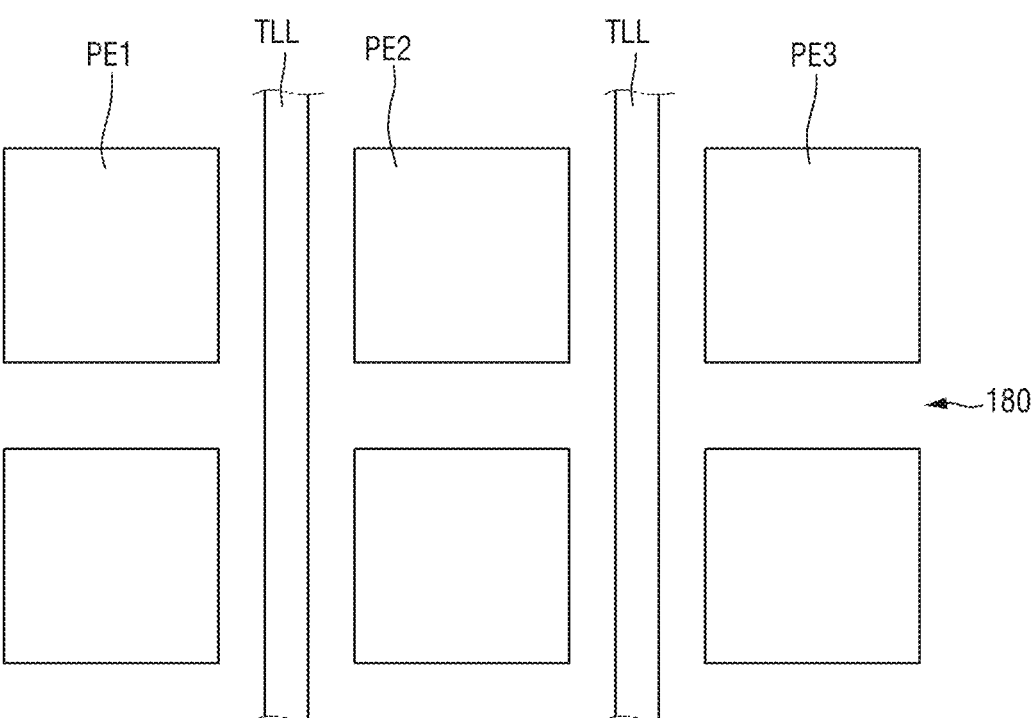
FIG. 7 is a plan view illustrating a planar arrangement structure of the pixel electrodes and the touch signal lines illustrated in FIG. 6.

FIG. 6 is a cross-sectional view for describing a process of forming pixel electrodes of the pixels and the touch signal lines illustrated in FIG. 5. FIG. 7 is a plan view illustrating a planar arrangement structure of the pixel electrodes and the touch signal lines illustrated in FIG. 6.

Referring to FIGS. 6 and 7, a second planarization layer 180 may be formed on the entire surface of the first planarization layer 160 to cover the entirety of the first planarization layer 160 including the second anode connection electrode ADNE2.

Connection contact holes may be formed in the second planarization layer 180 to each expose the second anode connection electrodes ADNE2, and each pixel electrode PE1, PE2, and PE3 may be patterned in the light emitting area of each pixel SP, including the connection contact holes exposing the second anode connection electrodes ADNE2.

In particular, when forming the plurality of pixel electrodes PE1, PE2, and PE3, each of the touch lines TLL may be formed of the same metal material through the same photo lithography process, etc., on the same process layer as the plurality of pixel electrodes PE1, PE2, and PE3. As illustrated in FIG. 7, each of the touch lines TLL may be formed and disposed in non-light emitting areas along areas between adjacent pixel electrodes of the plurality of pixel electrodes PE1, PE2, and PE3.

Thereafter, at least one light emitting element LED may be disposed on the first pixel electrode PE1, the second pixel electrode PE2, and the third pixel electrode PE3. Each light emitting element LED may be disposed in a light emitting area in which a pixel electrode for each pixel SP is formed.

Figure 8:
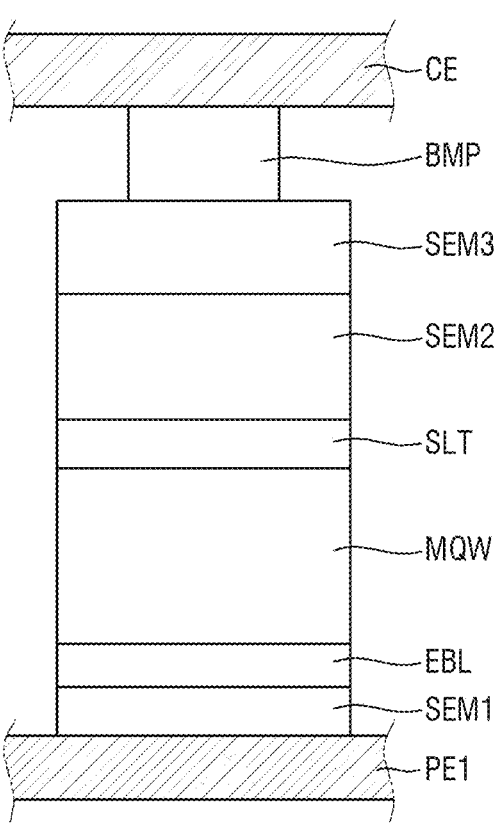
FIG. 8 is a cross-sectional view specifically illustrating a vertical light emitting element illustrated in FIG. 5.

FIG. 8 is a cross-sectional view specifically illustrating a vertical light emitting element illustrated in FIG. 5.

Referring to FIG. 8, each light emitting element LED may be a vertical light emitting diode element that extends to be elongated in the third direction (Z-axis direction), which is the thickness direction of the display panel 100.

Each light emitting element LED may include a first semiconductor layer SEM1, an electron blocking layer EBL, an active layer MQW, a super-lattice layer SLT, a second semiconductor layer SEM2, and a third semiconductor layer SEM3.

The first pixel electrode PE1 may include titanium oxide ($TiO_2$), indium tin oxide (ITO), indium zinc oxide (IZO), zinc oxide (ZnO), indium tin zinc oxide (ITZO), or magnesium oxide (MgO).

The first semiconductor layer SEM1 may be disposed on the first pixel electrode PE1. The first semiconductor layer SEM1 may be a p-type semiconductor, and may include a semiconductor material having a chemical formula of $Al_xGa_yIn_{1-x-y}N$ ($0 \leq x \leq 1$, $0 \leq y \leq 1$, and $0 \leq x+y \leq 1$). For example, the first semiconductor layer SEM1 may be made of any one or more of AlGaInN, GaN, AlGaN, InGaN, AlN, and InN doped with a p-type. The first semiconductor layer SEM1 may be doped with a p-type dopant, which may be Mg, Zn, Ca, Se, Ba, or the like. For example, the first semiconductor layer SEM1 may be made of p-GaN doped with p-type Mg.

The electron blocking layer EBL may be disposed on the first semiconductor layer SEM1. The electron blocking layer EBL may be a layer for suppressing or preventing too many electrons from flowing into the active layer MQW. For example, the electron blocking layer EBL may be made of p-AlGaN doped with p-type Mg. Here, the electron blocking layer EBL may be omitted.

The active layer MQW may be disposed on the electron blocking layer EBL. The active layer MQW may emit light by a combination of electron-hole pairs according to electrical signals applied through the first semiconductor layer SEM1 and the second semiconductor layer SEM2.

The active layer MQW may include a material having a single or multiple quantum well structure. When the active layer MQW includes the material having the multiple quantum well structure, the active layer MQW may also have a structure in which a plurality of well layers and barrier layers may be alternately stacked. In this case, the well layer may be formed of InGaN, and the barrier layer may be formed of GaN or AlGaN, but the disclosure is not limited thereto.

The active layer MQW may also have a structure in which semiconductor materials having large band gap energy and semiconductor materials having small band gap energy may be alternately stacked, and may also include other Group III to Group V semiconductor materials depending on a wavelength band of emitted light. The light emitted by the active layer MQW is not limited to first light, and in some cases, the active layer MQW may also emit second light (light of a green wavelength band) or third light (light of a red wavelength band).

The super-lattice layer SLT may be disposed on the active layer MQW. The super-lattice layer SLT may be a layer for alleviating stress between the second semiconductor layer SEM2 and the active layer MQW. For example, the super-lattice layer SLT may be formed of InGaN or GaN. The super-lattice layer SLT may be omitted in some implementations of this embodiment.

The second semiconductor layer SEM2 may be disposed on the super-lattice layer SLT. The second semiconductor layer SEM2 may be an n-type semiconductor. The second semiconductor layer SEM2 may include a semiconductor material having a chemical formula of $Al_xGa_yIn_{1-x-y}N$ ($0 \leq x \leq 1$, $0 \leq y \leq 1$, and $0 \leq x+y \leq 1$). For example, the second semiconductor layer SEM2 may be made of any one or more of AlGaInN, GaN, AlGaN, InGaN, AlN, and InN doped with an n-type. The second semiconductor layer SEM2 may be doped with an n-type dopant, which may be Si, Ge, Sn, or the like. For example, the second semiconductor layer SEM2 may be made of n-GaN doped with n-type Si.

The third semiconductor layer SEM3 may be disposed on the second semiconductor layer SEM2. The third semiconductor layer SEM3 may be disposed between the second semiconductor layer SEM2 and the common electrode CE. The third semiconductor layer SEM3 may be an undoped semiconductor. The third semiconductor layer SEM3 may include the same material as the second semiconductor layer SEM2, but may be made of a material that is not doped with an n-type or p-type dopant. In an embodiment, the third semiconductor layer SEM3 may be made of at least one of undoped InAlGaN, GaN, AlGaN, InGaN, AlN, and InN, but is not limited thereto.

At least one electrode or bump BMP may be further selectively formed on the third semiconductor layer SEM3. A thickness of the bump BMP may be preset or changed depending on a height difference between the third semiconductor layer SEM3 and the common electrode CE. The bump BMP may be formed of titanium (Ti), copper (Cu), or an alloy material of titanium (Ti) and copper (Cu).

FIGS. 9A to 9F are plan views sequentially illustrating a process of forming some pixels, a touch contact hole, and a light emitting opening illustrated in FIG. 5.

Figure 9A:
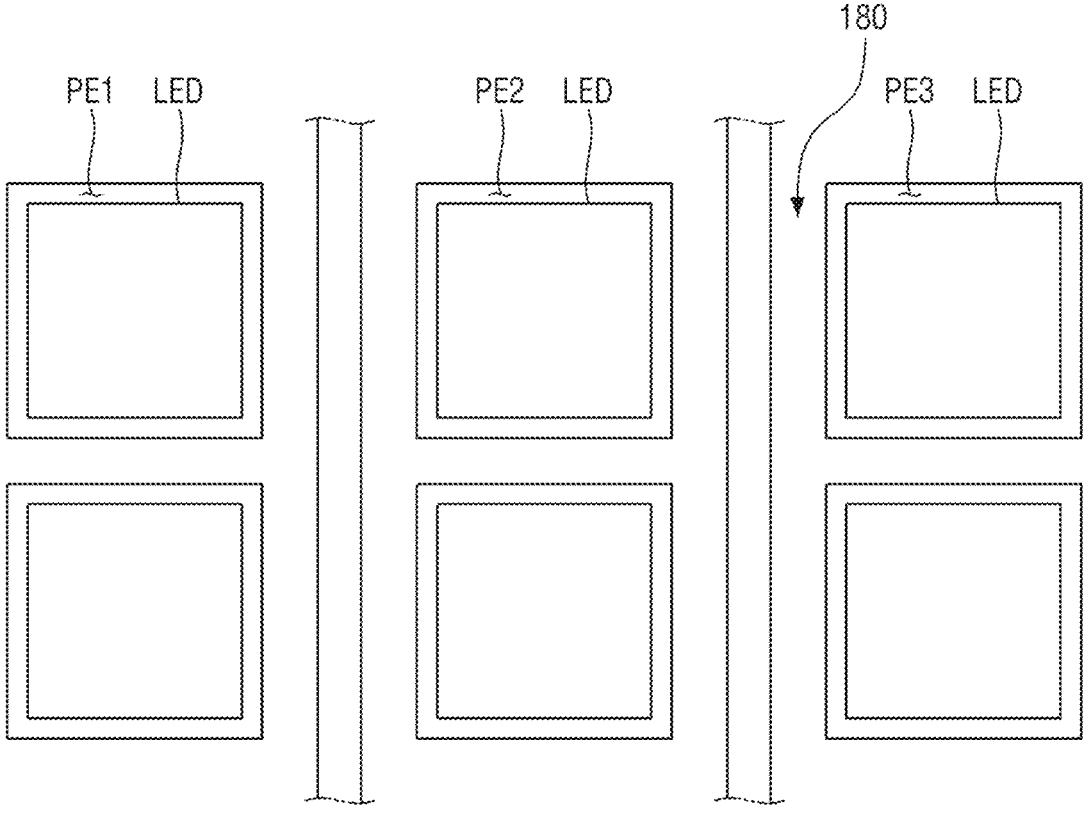
FIGS. 9A to 9F are plan views sequentially illustrating a process of forming some pixels, a touch contact hole, and a light emitting opening illustrated in FIG. 5.

Referring sequentially to FIGS. 9A to 9F together with FIG. 5, the pixel electrodes PE1, PE2, and PE3 may be patterned and formed on the second planarization layer 180 to correspond to the light emitting area of each pixel SP. As illustrated in FIG. 9A, each of the touch lines TLL may be patterned in the non-light emitting areas along the areas between the pixel electrodes PE1, PE2, and PE3.

Figure 9B:
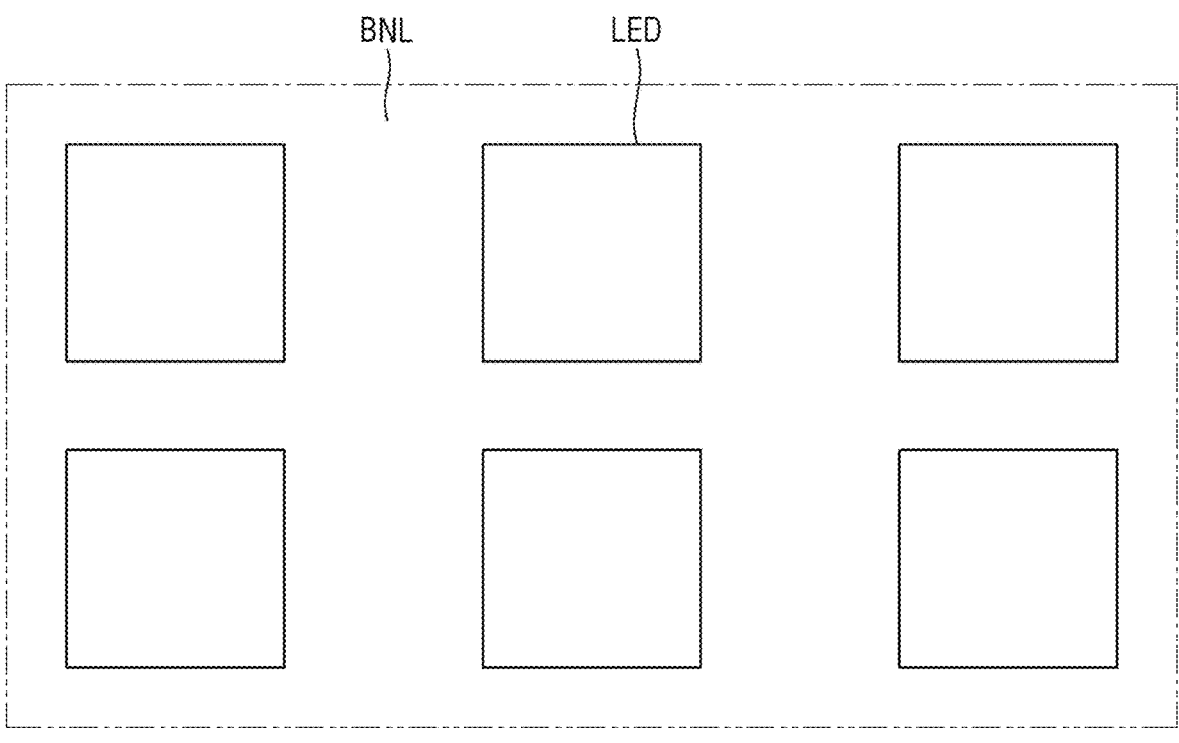
Figure 9C:
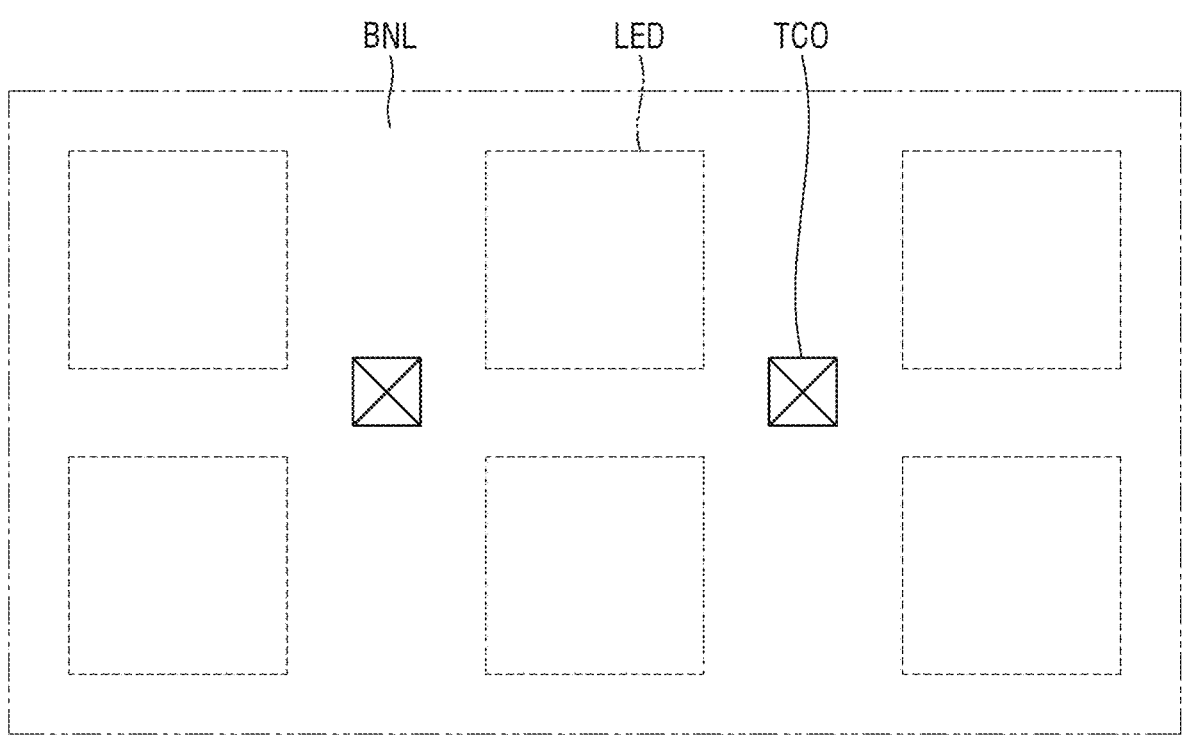

As illustrated in FIG. 9B, a bank BNL may be formed to cover all of the plurality of pixel electrodes PE1, PE2, and PE3 and the touch lines TLL. As illustrated in FIG. 9C, light emitting openings OPN that expose the first pixel electrode PE1, the second pixel electrode PE2, and the third pixel electrode PE3, and touch contact holes TCO that each expose a portion of the touch lines TLL may be further formed in the bank BNL. The light emitting openings OPN define light emitting areas for each pixel SP. Accordingly, the bank BNL defines light emitting areas of each pixel SP and a non-light emitting area, which may be an area between the light emitting areas. In particular, a touch contact hole TCO formation area that connects the touch electrodes SE of each of the touch lines TLL with each touch line TLL in a one-to-one manner is defined in the bank BNL.

As illustrated in FIG. 9C, a plurality of light emitting elements LED may be disposed on the first pixel electrode PE1, the second pixel electrode PE2, and the third pixel electrode PE3 that may be exposed by the light emitting openings OPN. Each light emitting element LED may be disposed in a light emitting area in which a pixel electrode for each pixel SP may be formed, that is, in the light emitting openings OPN. For example, a common electrode CE that electrically connects all light emitting elements LED may be formed in a front direction of the light emitting element portion LEP including the light emitting elements LED through a patterning process. In this case, the common electrode CE may be formed in a flat shape including the light emitting openings OPN and the touch contact holes TCO in plan view, or may be formed in a mesh structure through a photo lithography process, etc.

Figure 9D:
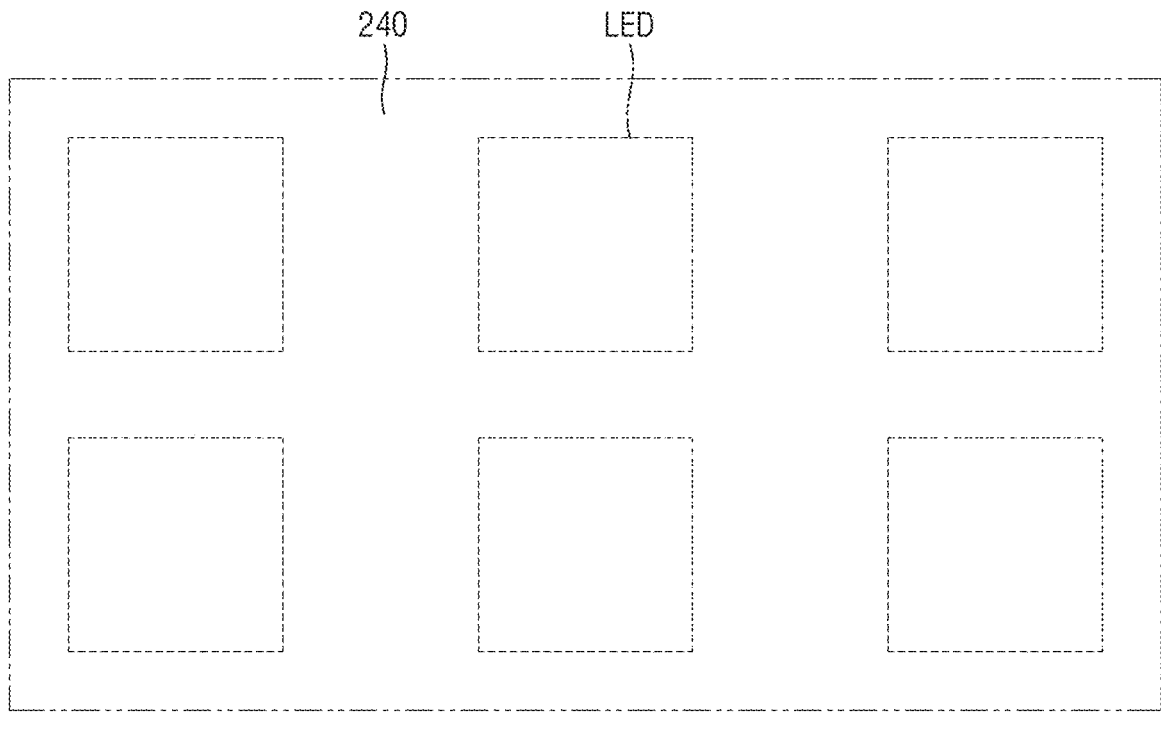
Figure 9E:
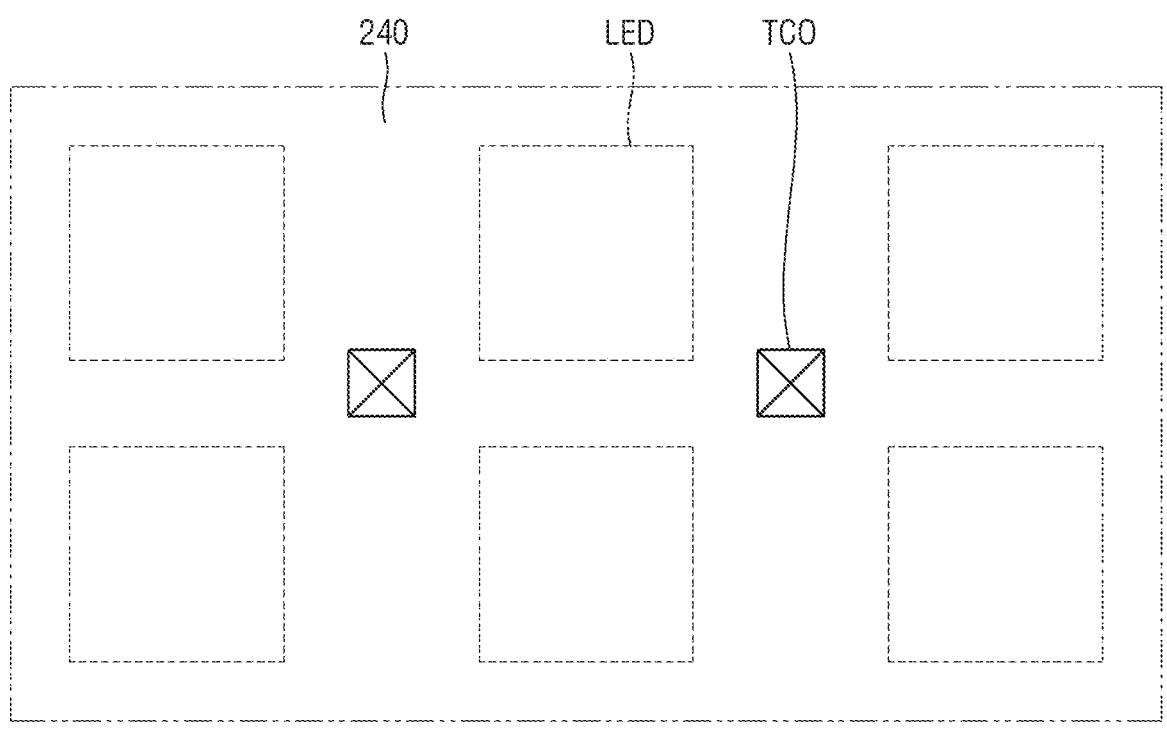

As illustrated in FIG. 9D, a planarization layer 240 may be formed on a front surface of the light emitting element portion LEP including the common electrode CE. As illustrated in FIG. 9E, at least one touch contact hole TCO may be formed in the planarization layer 240 so that each of the touch electrodes SE may be connected to each of the touch lines TLL formed in a rear direction of the touch electrodes SE in a one-to-one manner.

Figure 9F:
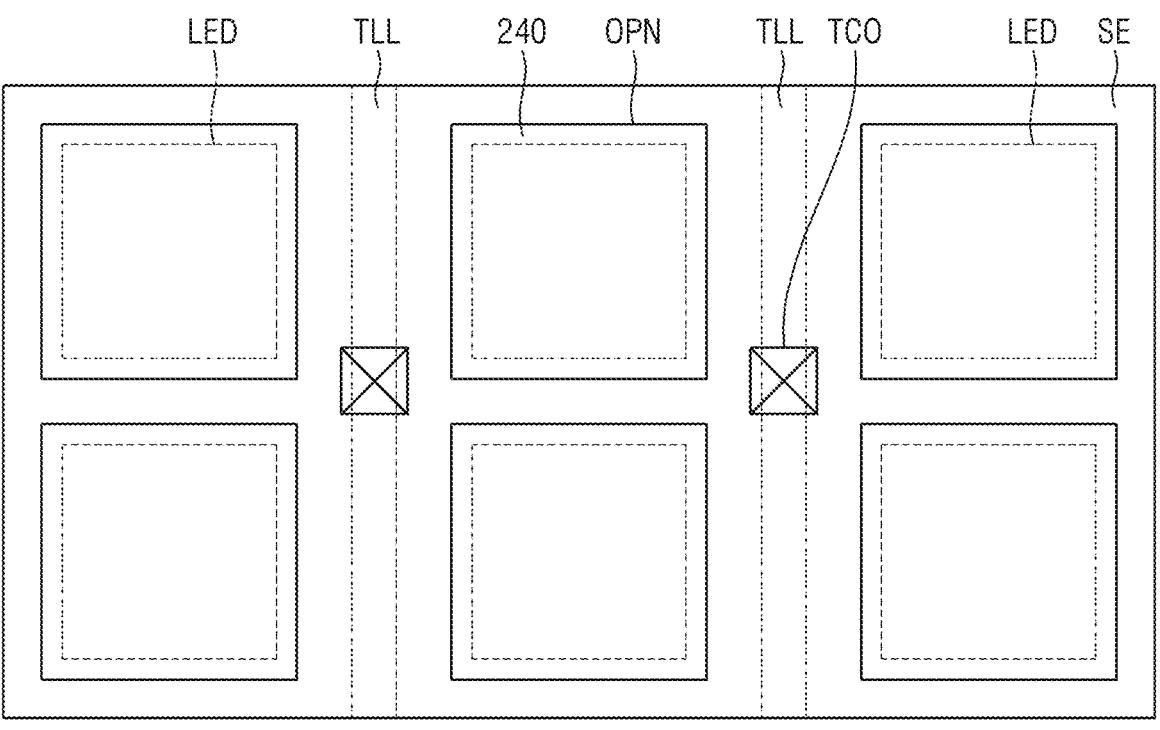

Referring to FIG. 9F, a plurality of touch electrodes SE may be formed on the front surface of the planarization layer 240 in a matrix structure in plan view. In this case, each of the touch electrodes SE may be electrically connected to each of the touch lines TLL through at least one touch contact hole TCO formed to pass through at least one planarization layer 240, the common electrode CE, and the bank BNL.

Figure 10:
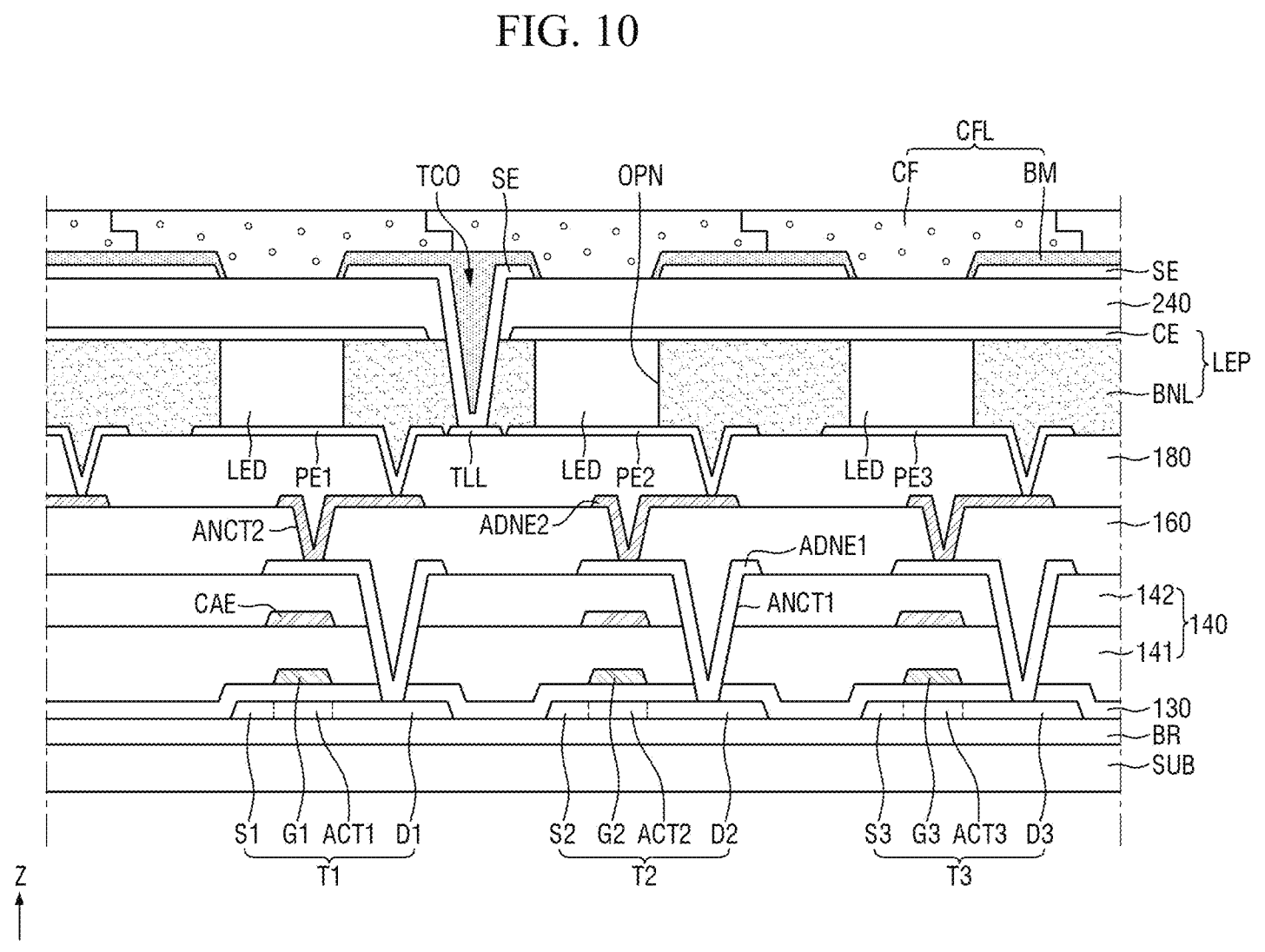

FIG. 10 is a cross-sectional view partially illustrating the cross-sectional arrangement structure of pixels, a touch sensing electrode, and a touch signal line of the display panel illustrated in FIGS. 1 and 2 according to a second embodiment.

Referring to FIG. 10, a first planarization layer 160 may be formed on the thin film transistors T1, T2, and T3 as well as the first anode connection electrode ADNE1 to planarize level differences caused by the thin film transistors T1, T2, and T3. For example, a plurality of second connection contact holes ANCT2 that each expose the first anode connection electrodes ADNE1 may be additionally patterned and formed in the first planarization layer 160.

A plurality of second anode connection electrodes ADNE2 may be formed on the first planarization layer 160 in which the plurality of second connection contact holes ANCT2 may be formed.

In particular, when forming the plurality of second anode connection electrodes ADNE2, each of the touch lines TLL may be formed of the same metal material through the same photo lithography process, etc., on the same process layer as the plurality of second anode connection electrodes ADNE2. As illustrated in FIG. 10, each of the touch lines TLL may be formed and disposed in non-light emitting areas along areas between adjacent second anode connection electrodes ADNE2 among the plurality of second anode connection electrodes ADNE2.

Thereafter, a second planarization layer 180 may be formed on the entire surface of the first planarization layer 160 to cover the entirety of the first planarization layer 160 including the second anode connection electrode ADNE2 together with each of the touch lines TLL.

In the second planarization layer 180, touch contact holes TCO may be formed so that each of the touch lines TLL may be partially exposed, and connection contact holes may be formed so that each of the second anode connection electrodes ADNE2 may be exposed. For example, the pixel electrodes PE1, PE2, and PE3 may be patterned and formed on the second planarization layer 180 to correspond to the light emitting area of each pixel SP.

A bank BNL may be formed on the second planarization layer 180 including the plurality of pixel electrodes PE1, PE2, and PE3 and the touch contact holes TCO, and light emitting openings OPN that expose the first pixel electrode PE1, the second pixel electrode PE2, and the third pixel electrode PE3, and touch contact holes TCO that each expose a portion of the touch lines TLL may be additionally formed in the bank BNL. A touch contact hole TCO formation area that connects the touch electrodes SE of each of the touch lines TLL with each touch line TLL in a one-to-one manner is defined in the bank BNL.

A plurality of light emitting elements LED may be disposed on the first pixel electrode PE1, the second pixel electrode PE2, and the third pixel electrode PE3 that may be exposed by the light emitting openings OPN. For example, a common electrode CE that electrically connects the light emitting elements LED may be formed in a front direction of the light emitting element portion LEP including the light emitting elements LED. In this case, the common electrode CE may be formed in a flat shape including the light emitting openings OPN and the touch contact holes TCO in plan view, or may be formed in a mesh structure through a photo lithography process, etc.

A planarization layer 240 may be formed on the front surface of the light emitting element portion LEP including the common electrode CE. For example, at least one touch contact hole TCO may be formed in the planarization layer 240 so that each of the touch electrodes SE may be connected to each of the touch lines TLL formed in a rear direction of the touch electrodes SE in a one-to-one manner.

A plurality of touch electrodes SE may be formed on the front surface of the planarization layer 240 in a matrix structure in plan view. In this case, each of the touch electrodes SE may be electrically connected to each of the touch lines TLL through at least one touch contact hole TCO formed to pass through at least one planarization layer 240, the common electrode CE, and the bank BNL.

A color filter layer CFL may be disposed in a front direction of the planarization layer 240, including the plurality of touch electrodes SE. The color filter layer CFL may be formed on the front surface of the planarization layer 240, including the plurality of touch electrodes SE, to include color filters CF such as red, green, and blue, and a black matrix BM. The color filters CF such as red, green, and blue may be disposed to each correspond to the light emitting area defined by the bank BNL and the front direction of the light emitting elements LED. For example, the black matrix BM may be formed in non-light emitting areas, which are areas between the light emitting areas.

Figure 11:
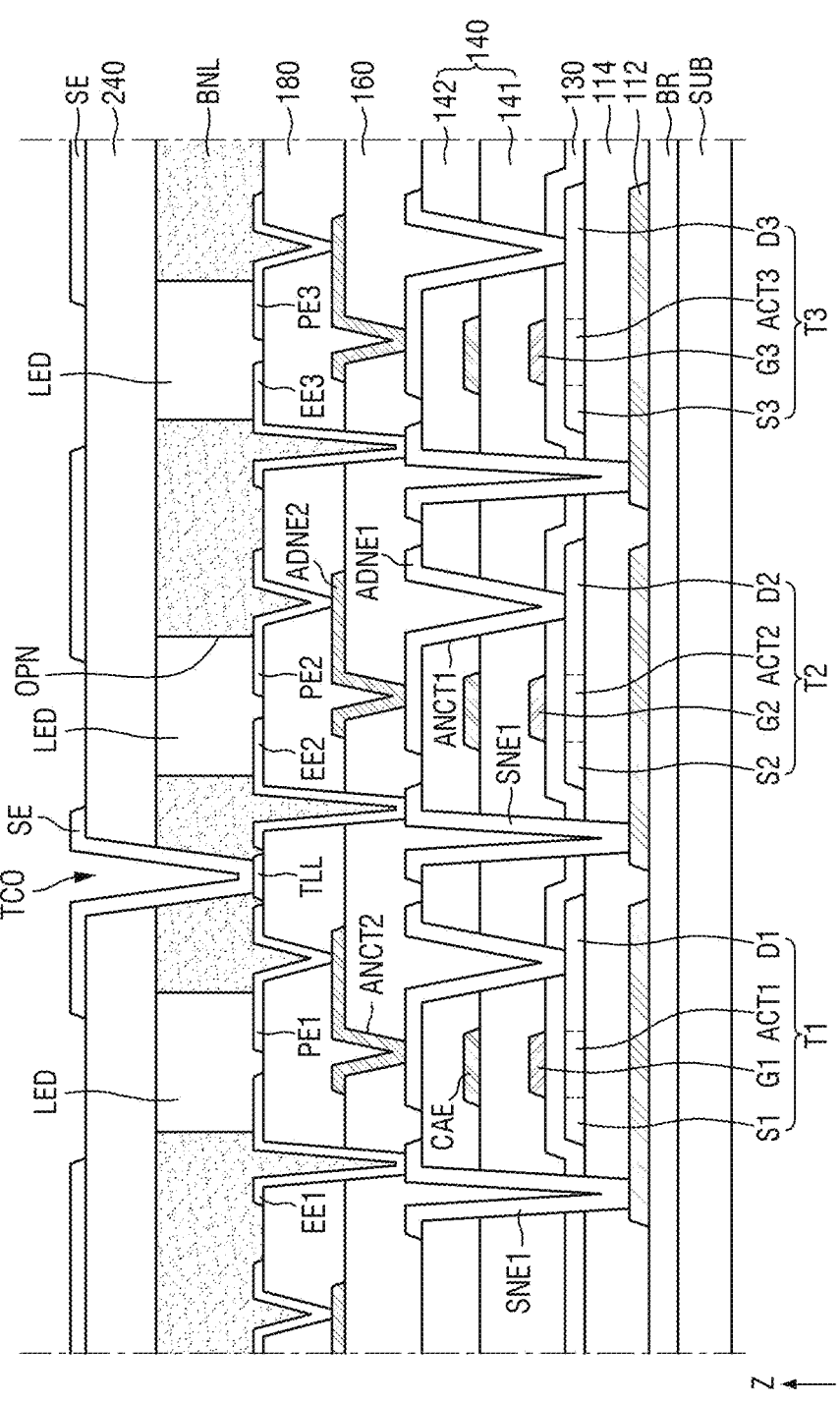
FIG. 11 is a cross-sectional view partially illustrating the cross-sectional arrangement structure of pixels, a touch sensing electrode, and a touch signal line of the display panel illustrated in FIGS. 1 and 2 according to a third embodiment.

FIG. 11 is a cross-sectional view partially illustrating the cross-sectional arrangement structure of pixels, a touch sensing electrode, and a touch signal line of the display panel illustrated in FIGS. 1 and 2 according to a third embodiment.

As illustrated in FIG. 11, a plurality of horizontal light emitting elements LED may be disposed on the first pixel electrode PE1, the second pixel electrode PE2, and the third pixel electrode PE3 that may be exposed by the light emitting openings OPN.

In order to supply a common voltage to the plurality of horizontal light emitting elements LED, a common voltage line 112 may first be formed on the barrier layer BR of the substrate SUB. For example, a protective layer 114 for planarization may be formed on the barrier layer BR including the common voltage line 112.

When forming the first connection contact hole ANCT1 penetrating through the gate insulating layer 130, the first interlayer insulating layer 141, and the second interlayer insulating layer 142 in the second interlayer insulating layer 142, a common line connection contact hole may also be formed at the same time so that the common voltage line 112 is exposed. The first interlayer insulating layer 141 and the second interlayer insulating layer 142 as well as the protective layer 114 may be patterned to expose the common voltage line 112.

In the process of forming the first anode connection electrode ADNE1 on the second interlayer insulating layer 142, a first common connection electrode SNE1 may be formed of the same material through the same process on the same process layer as the first anode connection electrode ADNE1.

A first planarization layer 160 may be formed on the second interlayer insulating layer 142, and a first common connection electrode SNE1 connection contact hole may be formed simultaneously so that the first common connection electrode SNE1 may be exposed along with the second connection contact hole ANCT2 penetrating through the first planarization layer 160.

A second anode connection electrode ADNE2 may be formed on the first planarization layer 160, and a second planarization layer 180 may be formed on the first planarization layer 160 on which the second anode connection electrode ADNE2 may be formed. In a patterning process of forming connection contact holes so that the second anode connection electrodes ADNE2 may each be exposed, a first common connection electrode SNE1 connection contact hole may be additionally formed.

Connection contact holes may be formed in the second planarization layer 180 to each expose the second anode connection electrodes ADNE2, and each pixel electrode PE1, PE2, and PE3 may be patterned in the light emitting area of each pixel SP, including the connection contact holes exposing the second anode connection electrodes ADNE2.

Figure 12:
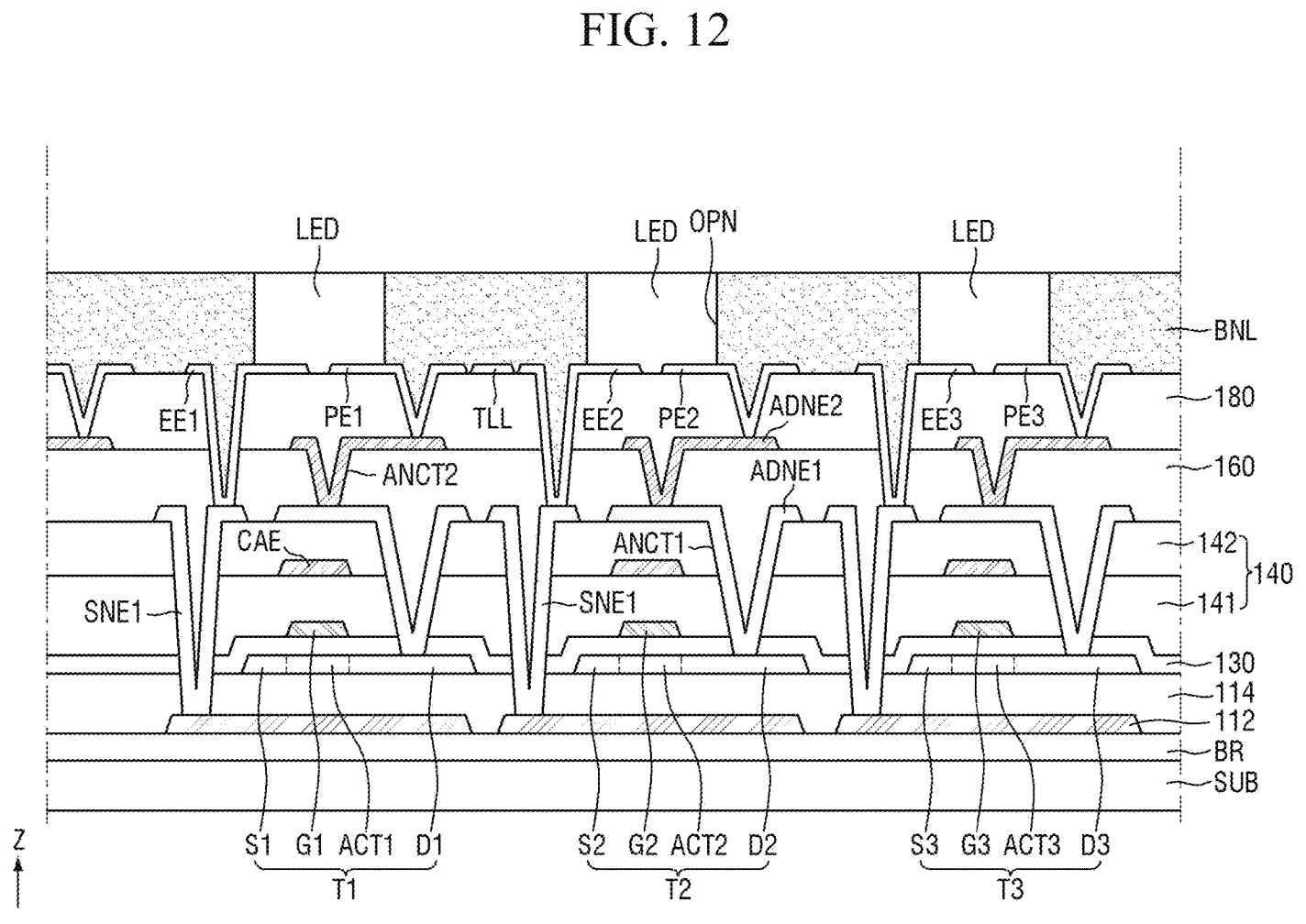

In particular, when forming the plurality of pixel electrodes PE1, PE2, and PE3, a plurality of common connection electrodes EE1, EE2, and EE3 and each of the touch lines TLL may be formed of the same metal material through the same photo lithography process, etc., on the same process layer as the plurality of pixel electrodes PE1, PE2, and PE3. As illustrated in FIG. 12, each of the touch lines TLL may be formed and disposed in non-light emitting areas along areas between adjacent pixel electrodes among the plurality of pixel electrodes PE1, PE2, and PE3. The plurality of common connection electrodes EE1, EE2, and EE3 may be connected to the first common connection electrodes SNE1 in a one-to-one manner through the first common connection electrode SNE1 connection contact hole.

Thereafter, at least one light element LED may be disposed on the first pixel electrode PE1 and the first common connection electrode EE1, the second pixel electrode PE2 and the second common connection electrode EE2, and the third pixel electrode PE3 and the third common connection electrode EE3.

A planarization layer 240 may be disposed on the front surface of the light emitting element portion LEP. The planarization layer 240 may planarize a level difference between an upper portion and a lower portion so that the touch electrode SE, which will be described later in more detail, may be formed.

At least one touch contact hole TCO may be formed in the planarization layer 240 so that each of the touch electrodes SE may be connected to each of the touch lines TLL formed in a rear direction of the touch electrodes SE in a one-to-one manner.

A plurality of touch electrodes SE may be formed on the front surface of the planarization layer 240 in a matrix structure in plan view. In this case, each of the touch electrodes SE may be electrically connected to each of the touch lines TLL through at least one touch contact hole TCO formed to pass through at least one planarization layer 240, the common electrode CE, and the bank BNL.

Figure 13:
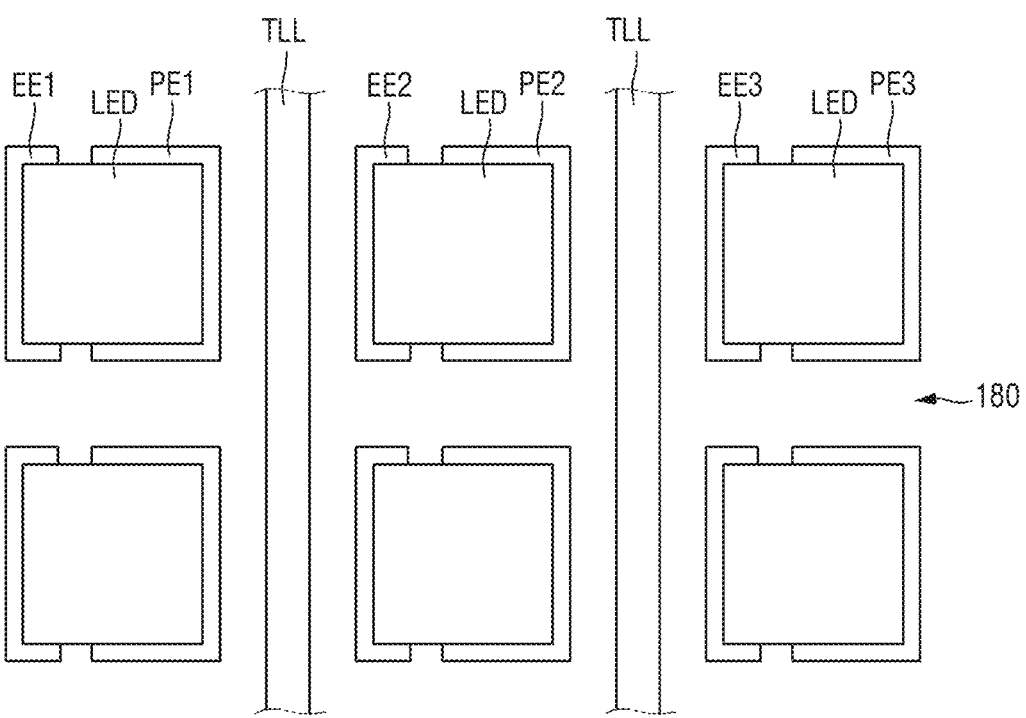
FIG. 13 is a plan view illustrating a planar arrangement structure of first and second pixel electrodes, touch signal lines, and horizontal light emitting elements illustrated in FIG. 12.

FIG. 12 is a cross-sectional view for describing a process of forming the first and second pixel electrodes of the pixels and the touch signal lines illustrated in FIG. 11. FIG. 13 is a plan view illustrating a planar arrangement structure of the first and second pixel electrodes, the touch signal lines, and the horizontal light emitting elements illustrated in FIG. 12.

Referring to FIGS. 12 and 13, a second anode connection electrode ADNE2 may be formed on the first planarization layer 160, and a second planarization layer 180 may be formed on the first planarization layer 160 on which the second anode connection electrode ADNE2 may be formed. Connection contact holes may be formed in the second planarization layer 180 so that the second anode connection electrodes ADNE2 may each be exposed, and in a patterning process of forming the connection contact holes so that the second anode connection electrodes ADNE2 may each be exposed, a first common connection electrode SNE1 connection contact hole may be additionally formed.

Each of the pixel electrodes PE1, PE2, and PE3 may be patterned in the light emitting area of each pixel SP, including the connection contact holes exposing the second anode connection electrodes ADNE2. In particular, when forming the plurality of pixel electrodes PE1, PE2, and PE3, a plurality of common connection electrodes EE1, EE2, and EE3 and each of the touch lines TLL may be formed of the same metal material through the same photo lithography process, etc., on the same process layer as the plurality of pixel electrodes PE1, PE2, and PE3.

As illustrated in FIG. 13, each of the touch lines TLL may be formed and disposed in non-light emitting areas along areas between adjacent pixel electrodes among the plurality of pixel electrodes PE1, PE2, and PE3.

Thereafter, at least one light element LED may be disposed on the first pixel electrode PE1 and the first common connection electrode EE1, the second pixel electrode PE2 and the second common connection electrode EE2, and the third pixel electrode PE3 and the third common connection electrode EE3. Unlike this, when at least one light emitting element LED may be disposed in an upper direction (e.g., a front direction in which an image is displayed), the first to third pixel electrodes PE1, PE2, and PE3 and the first to third common connection electrodes EE1, EE2, and EE3 may be respectively disposed and connected in the upper direction of each light emitting element LED.

Figure 14:
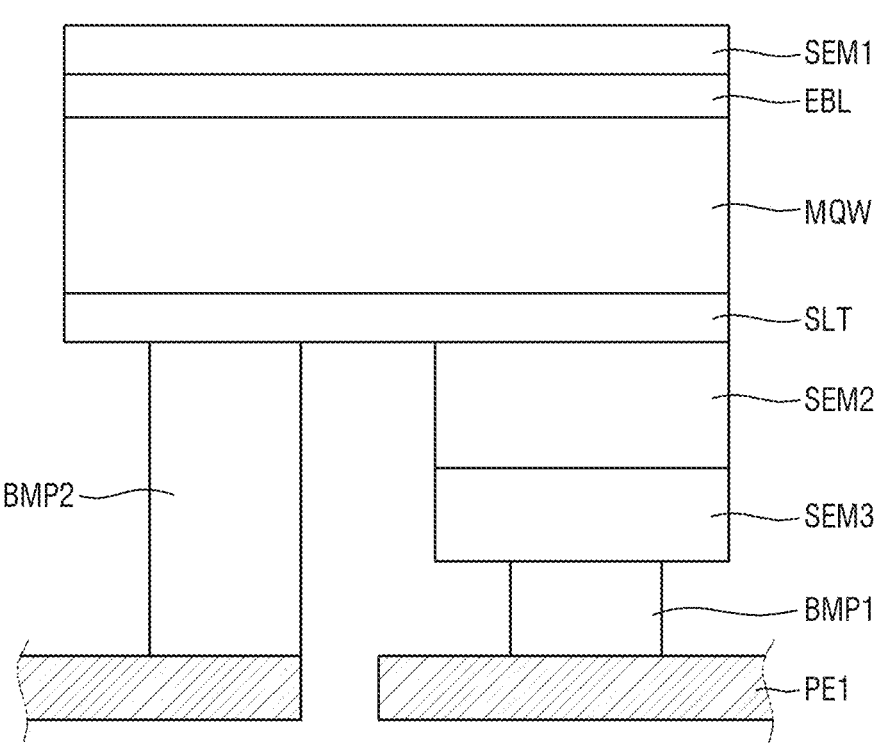
FIG. 14 is a cross-sectional view specifically illustrating a horizontal light emitting element illustrated in FIG. 13.

FIG. 14 is a cross-sectional view specifically illustrating a horizontal light emitting element illustrated in FIG. 13.

Referring to FIG. 14, the horizontal light emitting element LED may be disposed so that first and second bumps BMP1 and BMP2 may be in electrical contact with the first pixel electrode PE1 and the first common connection electrode EE1, the second pixel electrode PE2 and the second common connection electrode EE2, or the third pixel electrode PE3 and the third common connection electrode EE3.

Each light emitting element LED may include a first semiconductor layer SEM1, an electron blocking layer EBL, an active layer MQW, a super-lattice layer SLT, a second semiconductor layer SEM2, and a third semiconductor layer SEM3.

The first semiconductor layer SEM1 may be a p-type semiconductor, and may include a semiconductor material having a chemical formula of $Al_xGa_yIn_{1-x-y}N$ ($0 \leq x \leq 1$, $0 \leq y \leq 1$, and $0 \leq x+y \leq 1$). For example, the first semiconductor layer SEM1 may be made of any one or more of AlGaInN, GaN, AlGaN, InGaN, AlN, and InN doped with a p-type. The first semiconductor layer SEM1 may be doped with a p-type dopant, which may be Mg, Zn, Ca, Se, Ba, or the like. For example, the first semiconductor layer SEM1 may be made of p-GaN doped with p-type Mg.

The electron blocking layer EBL may be disposed in a rear direction of the first semiconductor layer SEM1. The electron blocking layer EBL may be made of p-AlGaN doped with p-type Mg. Here, the electron blocking layer EBL may be omitted in some implementations of this embodiment.

The active layer MQW may be disposed in a rear direction of the electron blocking layer EBL. The active layer MQW may emit light by a combination of electron-hole pairs according to electrical signals applied through the first semiconductor layer SEM1 and the second semiconductor layer SEM2. The active layer MQW may include a material having a single or multiple quantum well structure. When the active layer MQW includes the material having the multiple quantum well structure, the active layer MQW may also have a structure in which a plurality of well layers and barrier layers may be alternately stacked. In this case, the well layer may be formed of InGaN, and the barrier layer may be formed of GaN or AlGaN, but the disclosure is not limited thereto.

The active layer MQW may also have a structure in which semiconductor materials having large band gap energy and semiconductor materials having small band gap energy may be alternately stacked, and may also include other Group III to Group V semiconductor materials depending on a wavelength band of emitted light. The light emitted by the active layer MQW is not limited to first light, and in some cases, the active layer MQW may also emit second light (light of a green wavelength band) or third light (light of a red wavelength band).

The super-lattice layer SLT may be disposed in a rear direction of the active layer MQW. The super-lattice layer SLT may be a layer for alleviating stress between the second semiconductor layer SEM2 and the active layer MQW. The super-lattice layer SLT may be formed of InGaN or GaN.

The second bump BMP2 may be disposed on one partial surface of the super-lattice layer SLT, and may be in electrical contact with one of the common connection electrodes EE1, EE2, and EE3. The thickness or width of the second bump BMP2 may be formed to correspond to a gap between the super-lattice layer SLT and one of the common connection electrodes EE1, EE2, and EE3. The second bump BMP2 may be formed of titanium (Ti), copper (Cu), or an alloy material of titanium (Ti) and copper (Cu).

A second semiconductor layer SEM2 may be formed and disposed on the other partial surface of the super-lattice layer SLT without the second bump BMP2. The second semiconductor layer SEM2 may be an n-type semiconductor. The second semiconductor layer SEM2 may be made of a semiconductor material having a chemical formula of $Al_x$-$Ga_yIn_{1-x-y}N$ ($0 \leq x \leq 1$, $0 \leq y \leq 1$, and $0 \leq x+y \leq 1$), for example, any one or more of AlGaInN, GaN, AlGaN, InGaN, AlN, InN doped with an n-type. The second semiconductor layer SEM2 may be doped with an n-type dopant, which may be Si, Ge, Sn, or the like. For example, the second semiconductor layer SEM2 may be made of n-GaN doped with n-type Si.

The third semiconductor layer SEM3 may be disposed in a rear direction of the second semiconductor layer SEM2. The third semiconductor layer SEM3 may be disposed between the second semiconductor layer SEM2 and the common electrode CE. The third semiconductor layer SEM3 may be an undoped semiconductor. The third semiconductor layer SEM3 may include the same material as the second semiconductor layer SEM2, but may be made of a material that is not doped with an n-type or p-type dopant.

At least one electrode or first bump BMP1 may be selectively formed in the third semiconductor layer SEM3. The thickness or width of the first bump BMP1 may be preset or changed depending on a gap between the third semiconductor layer SEM3 and one of the pixel electrodes PE1, PE2, and PE3. The first bump BMP1 may be formed of titanium (Ti), copper (Cu), or an alloy material of titanium (Ti) and copper (Cu).

FIGS. 15A to 15D are plan views sequentially illustrating a process of forming some pixels, a touch contact hole, and a light emitting opening illustrated in FIG. 11.

Referring sequentially to FIGS. 15A to 15D along with FIGS. 11 and 13, first, as illustrated in FIG. 13, each of the pixel electrodes PE1, PE2, and PE3 and the common connection electrodes EE1, EE2, and EE3 may be patterned and formed on the second planarization layer 180 to correspond to the light emitting area of each pixel SP, and each of the touch lines TLL may be patterned in the non-light emitting areas, which are areas between the light emitting areas.

Figure 15A:
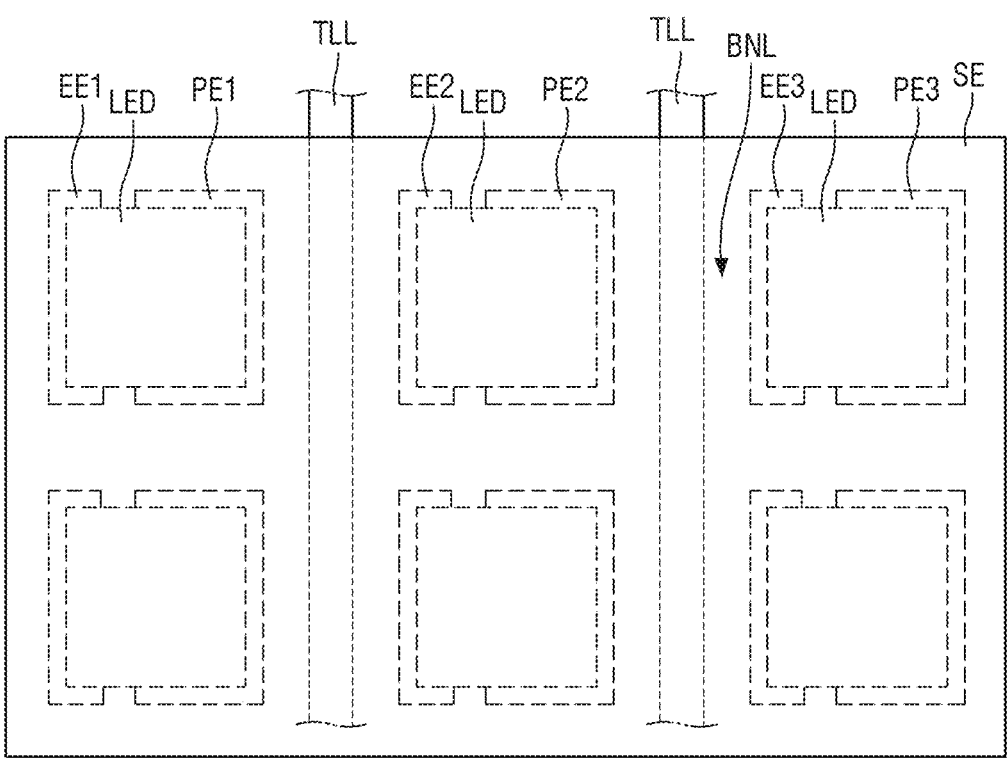
FIGS. 15A to 15D are plan views sequentially illustrating a process of forming some pixels, a touch contact hole, and a light emitting opening illustrated in FIG. 11.

Next, as illustrated in FIGS. 11 and 15A, a bank BNL may be formed to entirely cover each of the pixel electrodes PE1, PE2, and PE3, the common connection electrodes EE1, EE2, and EE3, and the touch lines TLL, and light emitting openings OPN that expose each of the pixel electrodes PE1, PE2, and PE3 and the common connection electrodes EE1, EE2, and EE3, and touch contact holes TCO that each expose a portion of the touch lines TLL may be additionally formed in the bank BNL. In particular, a touch contact hole TCO formation area that connects the touch electrodes SE of each of the touch lines TLL with each touch line TLL in a one-to-one manner may be defined in the bank BNL.

Figure 15B:
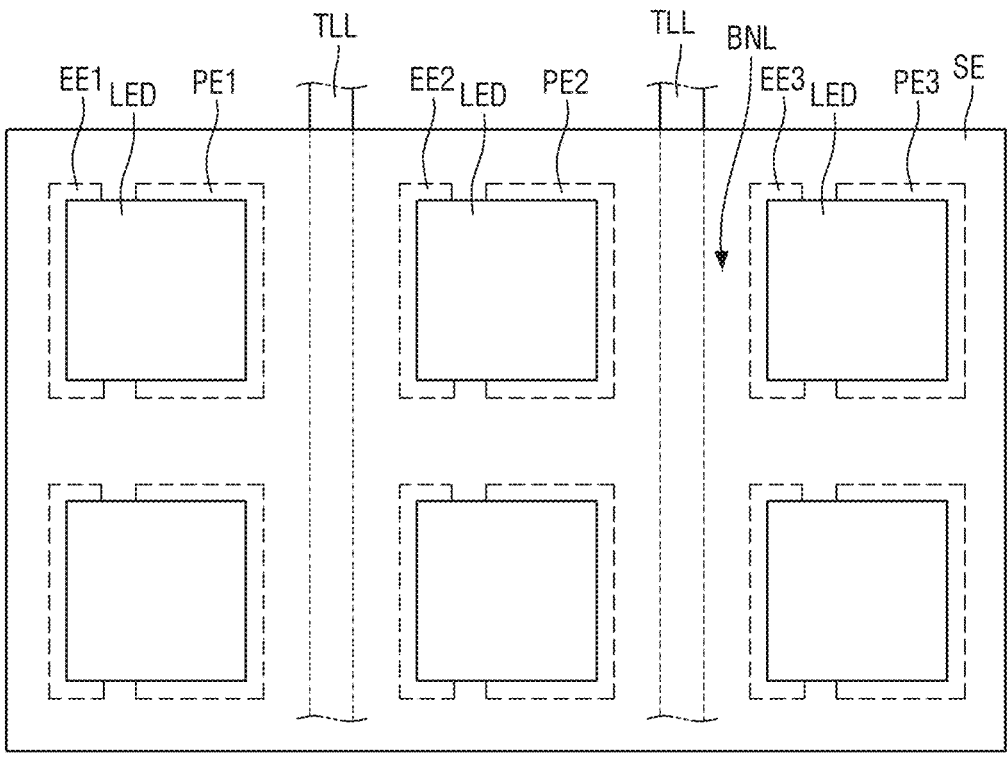

As illustrated in FIG. 15B, at least one light element LED may be disposed on the first pixel electrode PE1 and the first common connection electrode EE1, the second pixel electrode PE2 and the second common connection electrode EE2, and the third pixel electrode PE3 and the third common connection electrode EE3. For example, each light emitting element LED may be disposed in a light emitting area in which the pixel electrodes PE1, PE2, and PE3 for each pixel SP and the common connection electrodes EE1, EE2, and EE3 may be formed, that is, the light emitting openings OPN.

Figure 15C:
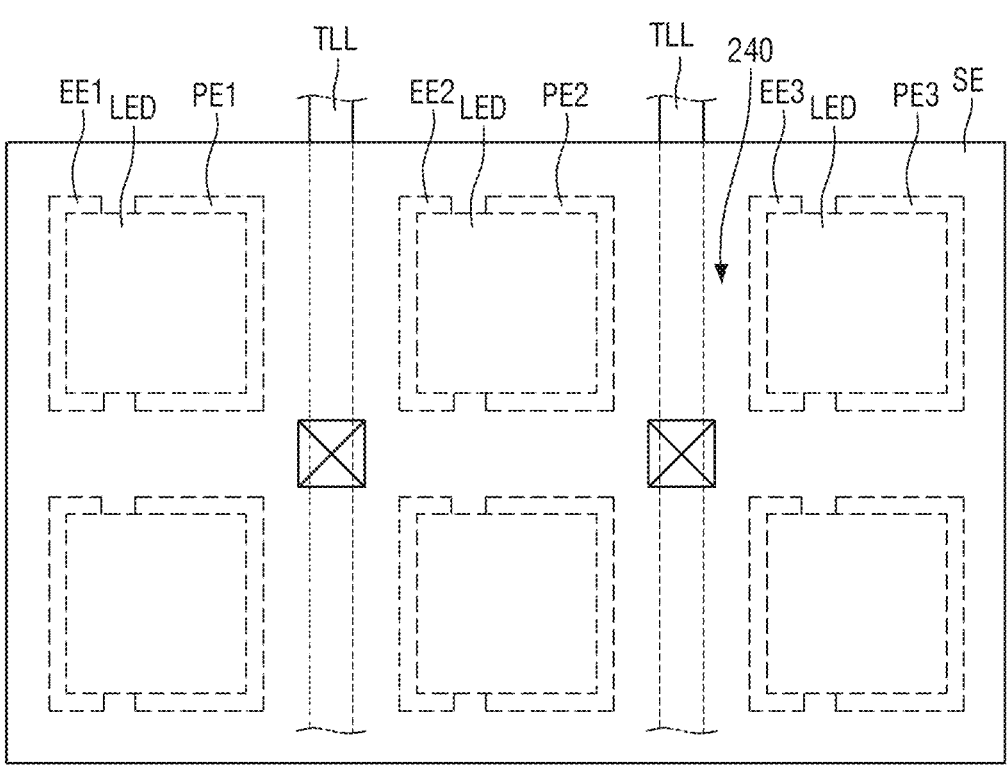
Figure 15D:
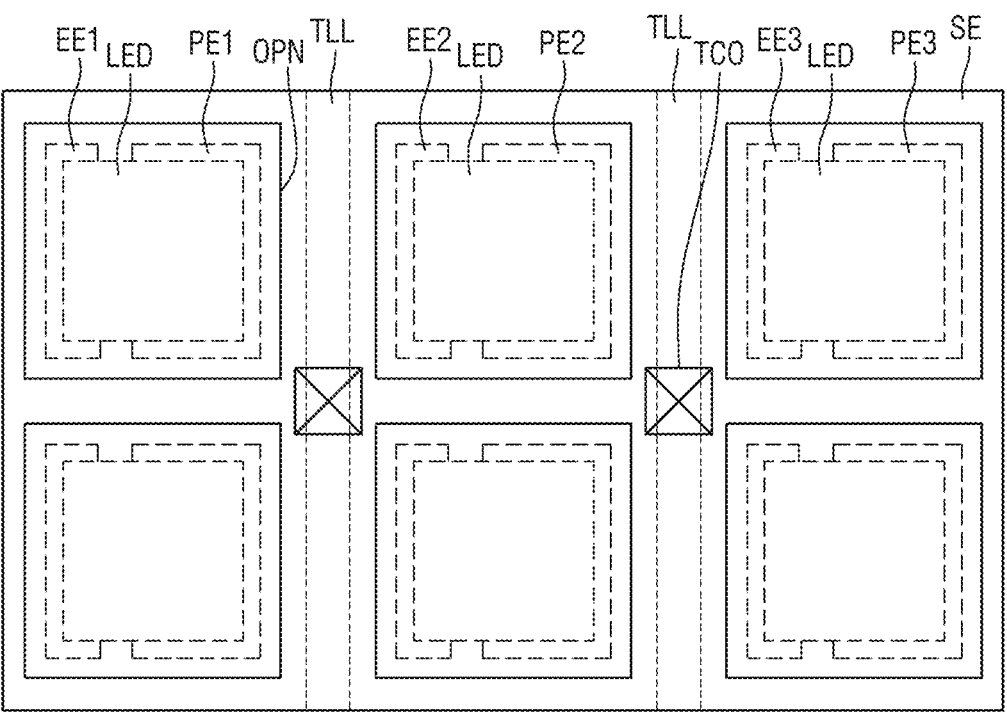

As illustrated in FIG. 15C, a planarization layer 240 may be formed on the front surface of the bank BNL including each light emitting element LED, and as illustrated in FIG. 15D, a plurality of touch electrodes SE may be formed on the front surface of the planarization layer 240 in a matrix structure in plan view. In this case, each of the touch electrodes SE may be electrically connected to each of the touch lines TLL through at least one touch contact hole TCO formed to pass through at least one planarization layer 240 and the bank BNL.

Figure 16:
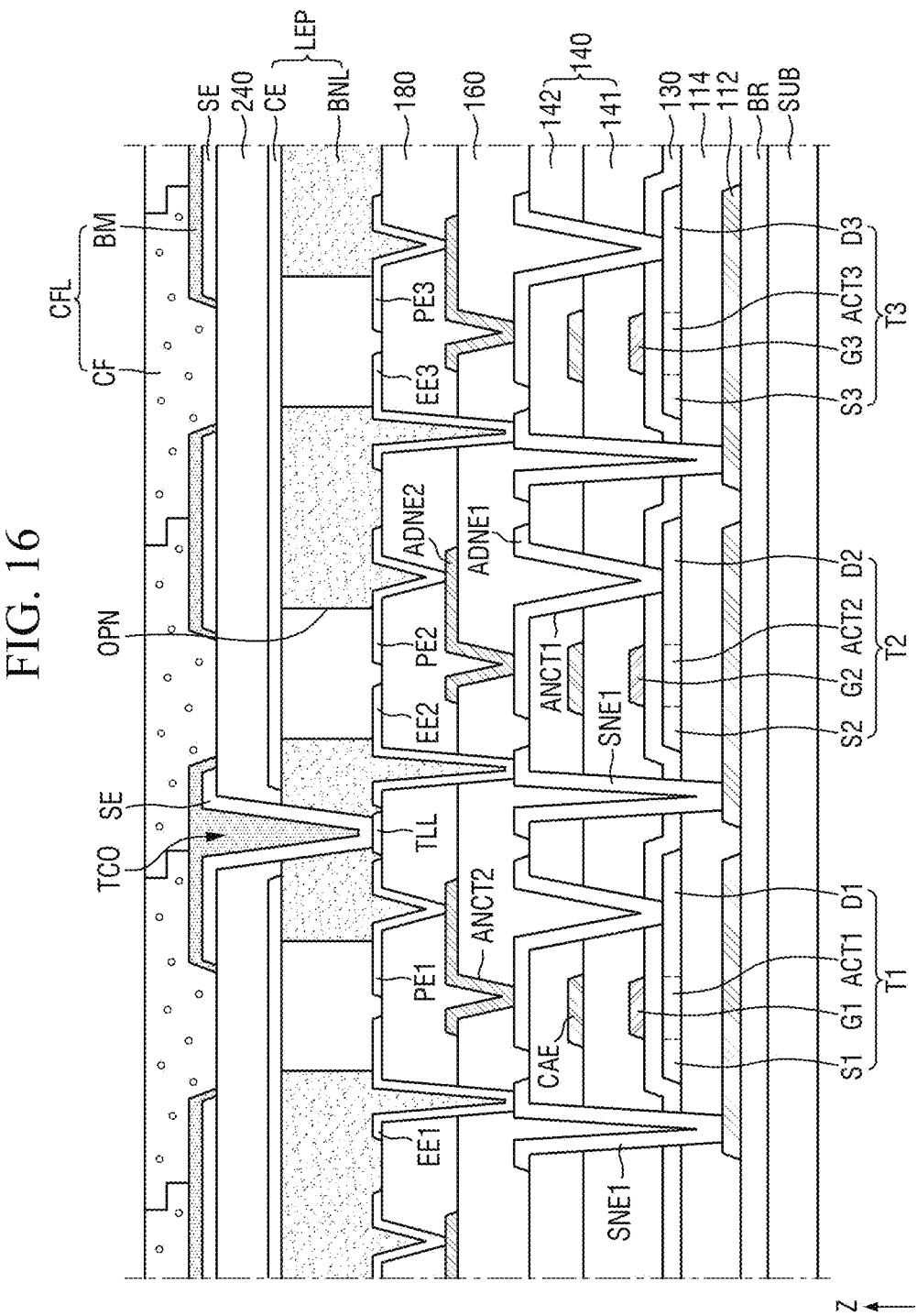
FIG. 16 is a cross-sectional view partially illustrating the cross-sectional arrangement structure of pixels, a touch sensing electrode, and a touch signal line of the display panel illustrated in FIGS. 1 and 2 according to a fourth embodiment.

FIG. 16 is a cross-sectional view partially illustrating the cross-sectional arrangement structure of pixels, a touch sensing electrode, and a touch signal line of the display panel illustrated in FIGS. 1 and 2 according to a fourth embodiment.

As illustrated in FIG. 16, a color filter layer CFL may be disposed in a front direction of the planarization layer 240, including the plurality of touch electrodes SE. The color filter layer CFL may be formed on the front surface of the planarization layer 240, including the plurality of touch electrodes SE, to include color filters CF such as red, green, and blue, and a black matrix BM. The color filters CF such as red, green, and blue may be disposed to each correspond to the light emitting area defined by the bank BNL and the front direction of the light emitting elements LED. For example, the black matrix BM may be formed in non-light emitting areas, which are areas between the light emitting areas.

Figure 17:
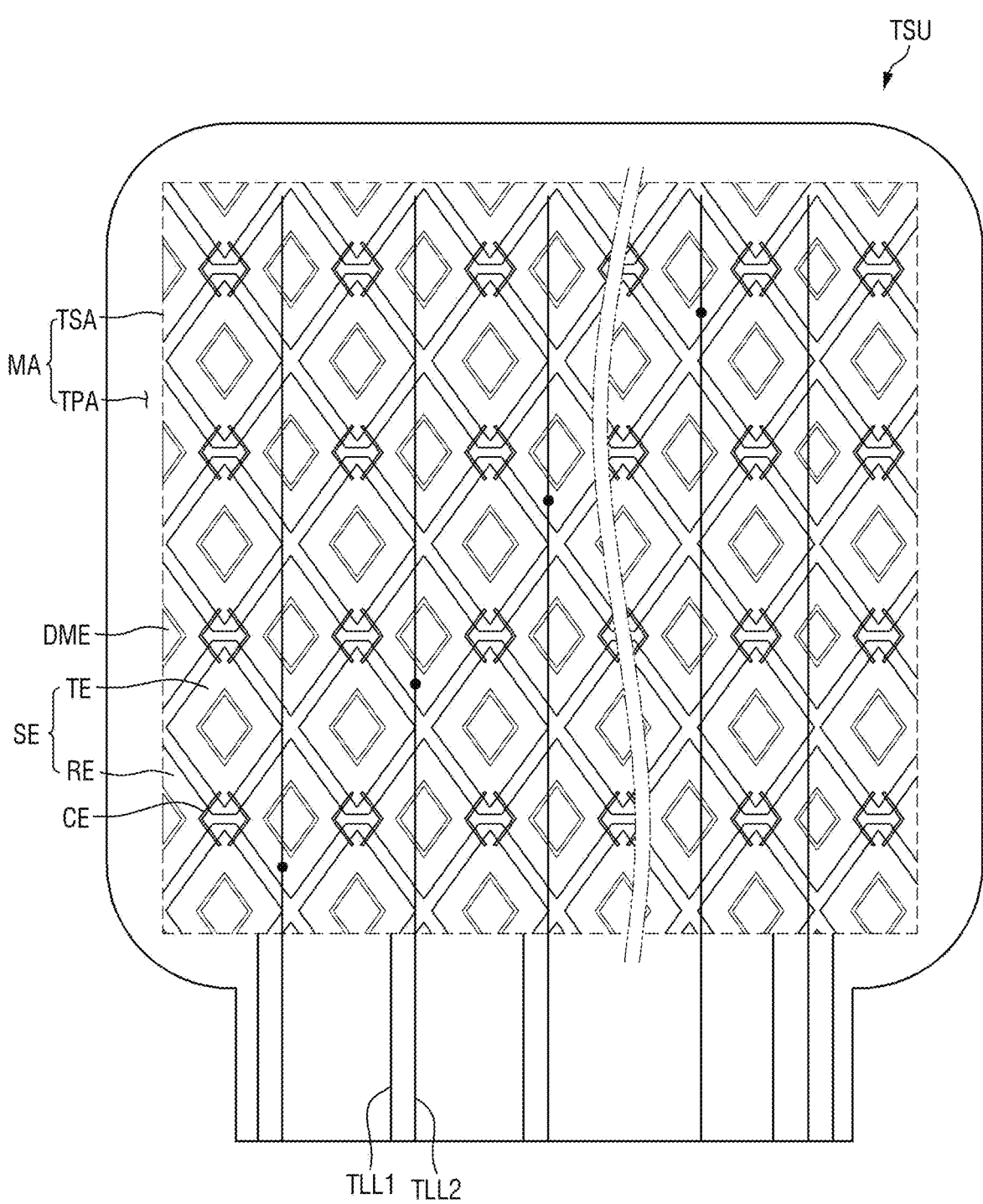
FIG. 17 is a layout view schematically illustrating the arrangement structure of touch sensing electrodes and touch signal lines according to the second embodiment of the disclosure.

FIG. 17 is a layout view schematically illustrating the arrangement structure of touch sensing electrodes and touch signal lines according to the second embodiment of the disclosure.

An example in which the touch electrodes SE in the main area MA may be configured and disposed to include two types of electrodes, for example, driving electrodes TE and sensing electrodes RE will be described with reference to FIG. 17. The touch electrodes SE in which the driving electrodes TE and the sensing electrodes RE may be separated senses a touch in a mutual capacitance manner by applying a touch driving signal to the driving electrodes TE and then sensing an amount of charge change in mutual capacitance of each of a plurality of touch nodes through the sensing electrodes RE.

In FIG. 17, for convenience of explanation, only a portion of the touch electrodes SE consisting of the driving electrodes TE and the sensing electrodes RE, dummy patterns DME, and touch lines TLL are illustrated.

The main area MA of the touch sensing unit TSU may include a touch sensing area TSA for sensing a user's touch and a touch peripheral area TPA disposed around the touch sensing area TSA. The touch sensing area TSA may overlap the display area DA, and the touch peripheral area TPA may overlap the non-display area NDA.

The driving electrodes TE, the sensing electrodes RE, and the dummy patterns DME may be disposed in the touch sensing area TSA. The driving electrodes TE and the sensing electrodes RE may be electrodes for forming mutual capacitance to sense a touch of an object or a person.

The sensing electrodes RE may be arranged in parallel in the first direction (X-axis direction) and the second direction (Y-axis direction). The sensing electrodes RE may be electrically connected to each other in the first direction (X-axis direction). The sensing electrodes RE adjacent to each other in the first direction (X-axis direction) may be connected to each other. The sensing electrodes RE adjacent to each other in the second direction (Y-axis direction) may be electrically separated from each other. Accordingly, a touch node at which a mutual capacitance is formed may be disposed at each of intersection portions between the driving electrodes TE and the sensing electrodes RE. A plurality of touch nodes may correspond to the intersection portions between the driving electrodes TE and the sensing electrodes RE.

The driving electrodes TE may be arranged in parallel in the first direction (X-axis direction) and the second direction (Y-axis direction). The driving electrodes TE adjacent to each other in the first direction (X-axis direction) may be electrically separated from each other. The driving electrodes TE may be electrically connected to each other in the second direction (Y-axis direction). The driving electrodes TE adjacent to each other in the second direction (Y-axis direction) may also be connected to each other through a distinct connection electrode.

Each of the dummy patterns DME may be disposed to be surrounded by the driving electrode TE or the sensing electrode RE. Each of the dummy patterns DME may be electrically separated from the driving electrode TE or the sensing electrode RE. Each of the dummy patterns DME may be disposed to be spaced apart from the driving electrode TE or the sensing electrode RE. Each of the dummy patterns DME may be electrically floated.

It is illustrated in FIG. 17 that each of the driving electrodes TE, the sensing electrodes RE, and the dummy patterns DME has a rhombic planar shape, but the disclosure is not limited thereto. For example, each of the driving electrodes TE, the sensing electrodes RE, and the dummy patterns DME may have a planar shape of a quadrangle other than a rhombus, a polygon other than a quadrangle, a circle, or an oval.

First touch lines TLL1 each electrically connected to the driving electrodes TE and second touch lines TLL2 each electrically connected to the sensing electrodes RE may be formed and disposed in the display area DA and the non-display area NDA of the display panel 100.

The first and second touch lines TLL1 and TLL2 may be formed of the same metal material through the same process on the same process layer as the pixel electrodes of the pixels SP formed in the display area DA. Unlike this, each touch line TLL may be formed of the same metal material through the same process on the same process layer as connection electrodes, connection lines, or contact electrodes of the pixels SP in addition to the pixel electrodes of the pixels SP formed in the display area DA.

Each of the driving electrodes TE and the sensing electrodes RE may be connected to each of the first and second touch lines TLL1 and TLL2 in a one-to-one manner through at least one touch contact hole penetrating through at least one layer or film of at least one insulating layer, at least one planarization layer 240, at least one bank BNL, and at least one planarization layer 180.

The touch driving circuit 400 may sense the amount of change in capacitance between the driving electrodes TE and the sensing electrodes RE by supplying driving signals to the driving electrodes TE through the first touch lines TLL1 and receiving sensing signals of the sensing electrodes RE through the second touch lines TLL2. The touch driving circuit 400 may calculate whether a user's touch is input and touch coordinates based on the amount of change in capacitance between the driving electrodes TE and the sensing electrodes RE.

Figure 18:
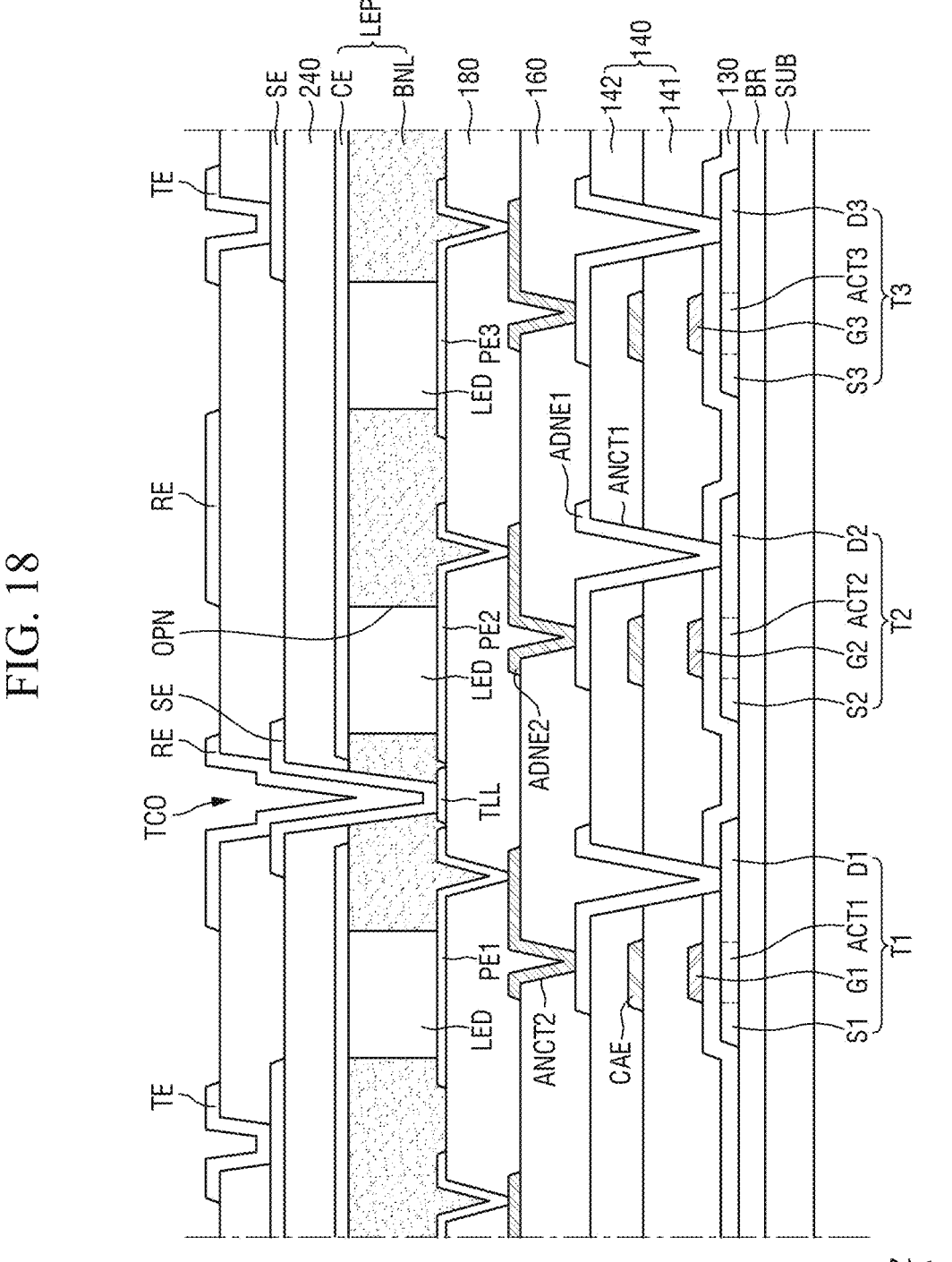
FIG. 18 is a cross-sectional view partially illustrating the cross-sectional arrangement structure of pixels, a touch sensing electrode, and a touch signal line of the display panel illustrated in FIG. 17 according to a fifth embodiment.

FIG. 18 is a cross-sectional view partially illustrating the cross-sectional arrangement structure of pixels, a touch sensing electrode, and a touch signal line of the display panel illustrated in FIG. 17 according to a fifth embodiment.

Referring to FIG. 18, each of the pixel electrodes PE1, PE2, and PE3 may be patterned and formed on the second planarization layer 180 to correspond to the light emitting area of each pixel SP, and each of the touch lines TLL may be patterned in non-light emitting areas along the areas between the pixel electrodes PE1, PE2, and PE3.

A bank BNL may be formed to cover all of the plurality of pixel electrodes PE1, PE2, and PE3 and the touch lines TLL, and light emitting openings OPN that expose the first pixel electrode PE1, the second pixel electrode PE2, and the third pixel electrode PE3, and touch contact holes TCO that each expose a portion of the touch lines TLL may be additionally formed in the bank BNL. The light emitting openings OPN define light emitting areas for each pixel SP. Accordingly, the bank BNL defines light emitting areas of each pixel SP and a non-light emitting area, which is an area between the light emitting areas. In particular, a touch contact hole TCO formation area that connects the touch electrodes SE of each of the touch lines TLL with each touch line TLL in a one-to-one manner is defined in the bank BNL.

A plurality of light emitting elements LED may be disposed on the first pixel electrode PE1, the second pixel electrode PE2, and the third pixel electrode PE3 that may be exposed by the light emitting openings OPN.

A common electrode CE that electrically connects all light emitting elements LED may be formed in a front direction of the light emitting element portion LEP including the light emitting elements LED through a patterning process. In this case, the common electrode CE may be formed in a flat shape including the light emitting openings OPN and the touch contact holes TCO in plan view, or may be formed in a mesh structure through a photo lithography process, etc.

A planarization layer 240 may be formed on the front surface of the light emitting element portion LEP including the common electrode CE. Connection electrodes may be formed and disposed on the planarization layer 240. The connection electrodes may be formed by first forming a second conductive metal layer for forming the connection electrodes on the planarization layer 240, applying a photoresist layer on the second conductive metal layer, and then performing a patterning process.

Depending on a depth of the touch contact hole TCO, it may be difficult to electrically connect each touch line TLL. For example, in order to electrically connect each touch line TLL through the touch contact hole TCO, the same electrode material as the connection electrode may be first connected to the touch contact hole TCO when forming the connection electrode. For example, a touch insulating layer 242 may be formed on the planarization layer 240 including the connection electrodes. The touch insulating layer 242 may formed by applying an insulating material layer for forming the touch insulating layer 242 on the front surface of the planarization layer 240 including the connection electrodes.

Touch contact holes may be formed in the touch insulating layer 242 so that a portion of the front surface of the connection electrodes is exposed, and driving electrodes TE and sensing electrodes RE may be formed on the touch insulating layer 242 in which the touch contact holes may be formed.

In concluding the detailed description, those skilled in the art will appreciate that many variations and modifications can be made to the embodiments described hereinabove without substantially departing from the spirit and scope of the disclosure. Therefore, the embodiments of the disclosure described hereinabove are used in a generic and descriptive sense only and not for purposes of limitation.

What is claimed is:

1. A display device comprising:
a display panel including a display area and a non-display area around the display area, the display panel including a plurality of pixels disposed in the display area;
a touch sensing unit that includes a plurality of touch electrodes arranged on a front surface of the display panel; and
a touch driving circuit supplying driving signals to the plurality of touch electrodes through a plurality of touch lines and detecting coordinates of a touch position of the touch sensing unit, wherein
the plurality of touch lines are formed and disposed in a rear surface direction of at least one touch electrode so as to overlap the at least one touch electrode of the plurality of touch electrodes,
the plurality of touch electrodes are respectively connected to the plurality of touch lines through at least one touch contact hole,
the plurality of touch lines are formed of a same metal material on a same process layer as at least one electrode included in the plurality of pixels formed in the display area, and
the plurality of touch lines are disposed on a layer that is closer to the substrate than the plurality of touch electrodes, and the plurality of touch lines are completely covered by at least a planarization layer and a bank, such that the planarization layer and the bank are interposed between the plurality of touch lines and the plurality of touch electrodes.

2. The display device of claim 1, wherein
the plurality of touch electrodes are arranged in a matrix structure in plan view on a front surface of the display area,
the plurality of touch lines extend from the display area to the non-display area, and
an end of each of the plurality of touch lines is electrically connected to at least one touch electrode of the plurality of touch electrodes through at least one touch contact hole, and another end is electrically connected to the touch driving circuit.

3. The display device of claim 2, wherein
the plurality of touch electrodes include driving electrodes and sensing electrodes arranged alternately in a matrix structure in plan view on the front surface of the display area,
the plurality of touch lines extend from the display area to the non-display area,
an end of each of a plurality of first touch lines of the plurality of touch lines is electrically connected to at least one driving electrode of the driving electrodes through at least one touch contact hole, and another end is electrically connected to the touch driving circuit, and
an end of each of a plurality of second touch lines of the plurality of touch lines is electrically connected to at least one sensing electrode of the sensing electrodes through at least one touch contact hole, and another end is electrically connected to the touch driving circuit.

4. The display device of claim 2, wherein the plurality of touch lines are formed of a same metal material through a same process on a same process layer as a connection electrode of a thin film transistor or at least one connection line formed in the display area.

5. The display device of claim 4, wherein the at least one touch contact hole is formed to pass through at least one layer of at least one planarization layer, at least one organic or inorganic insulating layer, and at least one organic or inorganic protective layer and expose at least one touch line of the plurality of touch lines.

6. The display device of claim 5, wherein the at least one touch contact hole is formed to penetrate through at least one layer of the at least one planarization layer, the at least one organic or inorganic insulating layer, and the at least one organic or inorganic protective layer and at least one metal electrode and expose at least one touch line of the plurality of touch lines.

7. The display device of claim 2, wherein
the plurality of pixels include at least one first organic or inorganic insulating layer, a first anode electrode, a second organic or inorganic insulating layer, a second anode electrode, a planarization layer, a pixel electrode, a bank, and a common electrode formed by sequentially stacking on a front surface of at least one plurality of thin film transistors, and
the plurality of touch lines are formed of the same metal material through a same process on a same process layer as the pixel electrode, or are formed of the same metal material through a same process on a same process layer as the first anode electrode or the second anode electrode.

8. The display device of claim 7, wherein
the plurality of touch electrodes are respectively connected to the plurality of touch lines through at least one touch contact hole, and
the at least one touch contact hole is formed to penetrate through at least one layer of the at least one first organic or inorganic insulating layer, the second organic or inorganic insulating layer, the planarization layer, and the bank and expose at least one touch line of the plurality of touch lines.

9. The display device of claim 8, wherein the at least one touch contact hole is formed to penetrate through at least one layer or film of the at least one first organic or inorganic insulating layer, the second organic or inorganic insulating layer, the planarization layer, and the bank and the common electrode and expose at least one touch line of the plurality of touch lines.

10. The display device of claim 2, wherein a color filter layer is further formed in a front direction of the touch sensing unit in which the plurality of touch electrodes are arranged.

11. A display device comprising:
a display panel including a display area and a non-display area around the display area, the display panel including a plurality of pixels disposed in the display area;
a touch sensing unit that includes a plurality of touch electrodes arranged on a front surface of the display panel;
a display driving circuit driving the plurality of pixels; and
a touch driving circuit detecting coordinates of a touch position of the touch sensing unit through a plurality of touch lines, wherein the plurality of touch lines are formed and disposed in the display area of the display panel so as to overlap at least one touch electrode of the plurality of touch electrodes, the plurality of touch electrodes are respectively connected to the plurality of touch lines through at least one touch contact hole, the at least one touch contact hole is formed to penetrate through at least one layer of a planarization layer, at least one organic or inorganic insulating layer, and at least one organic or inorganic protective layer of the display area and expose the plurality of touch lines; and the plurality of touch lines are disposed on a layer that is closer to the substrate than the plurality of touch electrodes, and the plurality of touch lines are completely covered by at least the planarization layer and a bank, such that the planarization layer and the bank are interposed between the plurality of touch lines and the plurality of touch electrodes.

12. The display device of claim 11, wherein the plurality of touch electrodes are arranged in a matrix structure in plan view on a front surface of the display area, the plurality of touch lines extend from the display area to the non-display area, and an end of each of the plurality of touch lines is electrically connected to at least one touch electrode of the plurality of touch electrodes through at least one touch contact hole, and another end is electrically connected to the touch driving circuit.

13. The display device of claim 12, wherein the plurality of touch electrodes include driving electrodes and sensing electrodes arranged alternately in a matrix structure in plan view on the front surface of the display area, the plurality of touch lines extend from the display area to the non-display area, an end of each of a plurality of first touch lines of the plurality of touch lines is electrically connected to at least one driving electrode of the driving electrodes through at least one touch contact hole, and another end is electrically connected to the touch driving circuit, and an end of each of a plurality of second touch lines of the plurality of touch lines is electrically connected to at least one sensing electrode of the sensing electrodes through at least one touch contact hole, and another end is electrically connected to the touch driving circuit.

14. The display device of claim 12, wherein the plurality of touch lines are formed of a same metal material through a same process on a same process layer as pixel electrodes included in the plurality of pixels formed in the display area, or are formed of the same metal material through a same process on a same process layer as a connection electrode of a thin film transistor or at least one connection line formed in the display area.

15. The display device of claim 14, wherein the plurality of touch electrodes are respectively connected to the plurality of touch lines through at least one touch contact hole, and the at least one touch contact hole is formed to penetrate through the at least one layer and expose at least one touch line of the plurality of touch lines.

16. The display device of claim 15, wherein the at least one touch contact hole is formed to penetrate through the at least one layer and at least one metal electrode and expose at least one touch line of the plurality of touch lines.

17. The display device of claim 12, wherein the plurality of pixels include at least one first organic or inorganic insulating layer, a first anode electrode, a second organic or inorganic insulating layer, a second anode electrode, a planarization layer, a pixel electrode, a bank, and a common electrode formed by sequentially stacking on a front surface of at least one plurality of thin film transistors, and the plurality of touch lines are formed of the same metal material through the same process on the same process layer as the pixel electrode, or are formed of the same metal material through the same process on the same process layer as the first anode electrode or the second anode electrode.

18. The display device of claim 17, wherein the plurality of touch electrodes are respectively connected to the plurality of touch lines through at least one touch contact hole, and the at least one touch contact hole is formed to penetrate through at least one layer or film of the at least one first organic or inorganic insulating layer, the second organic or inorganic insulating layer, the planarization layer, and the bank and expose at least one touch line of the plurality of touch lines.

19. An electronic device including a display device, the display device comprising:

a display panel including a display area and a non-display area around the display area, the display panel including a plurality of pixels disposed in the display area;

a touch sensing unit that includes a plurality of touch electrodes arranged on a front surface of the display panel; and a touch driving circuit supplying driving signals to the plurality of touch electrodes through a plurality of touch lines and detecting coordinates of a touch position of the touch sensing unit, wherein the plurality of touch lines are formed and disposed in a rear surface direction of at least one touch electrode so as to overlap the at least one touch electrode of the plurality of touch electrodes, the plurality of touch electrodes are respectively connected to the plurality of touch lines through at least one touch contact hole, the plurality of touch lines are formed of a same metal material on a same process layer as at least one electrode included in the plurality of pixels formed in the display area, and the plurality of touch lines are disposed on a layer that is closer to the substrate than the plurality of touch electrodes, and the plurality of touch lines are completely covered by at least a planarization layer and a bank, such that the planarization layer and the bank are interposed between the plurality of touch lines and the plurality of touch electrodes.

* * * * *